United States Patent [19]
Pathare et al.

[11] Patent Number: 5,986,877
[45] Date of Patent: Nov. 16, 1999

[54] TANTALUM METAL POWER WITH CONTROLLED SIZE DISTRIBUTION AND PRODUCTS MADE THEREFROM

[75] Inventors: Viren M. Pathare, Allentown; Bhamidipaty K. D. P. Rao, Wyomissing; James Allen Fife, Reading; Hongju Chang, Wayne; Roger W. Steele, Neffs; Lee M. Ruch, Shillington, all of Pa.

[73] Assignee: Cabot Corporation, Boston, Mass.

[21] Appl. No.: 09/123,818

[22] Filed: Jul. 28, 1998

Related U.S. Application Data

[62] Division of application No. 08/638,922, Apr. 25, 1996.
[51] Int. Cl.[6] ....................................................... H01G 9/04
[52] U.S. Cl. ............................ 361/508; 361/528; 361/529
[58] Field of Search ..................................... 361/508, 510, 361/516, 528, 529, 533, 532; 73/356, 425, 255, 245, 228, 229, 746, 751, 758, 765, 770, 769

[56] References Cited

U.S. PATENT DOCUMENTS

| | | | |
|---|---|---|---|
| 3,418,106 | 12/1968 | Pierret | 75/245 |
| 3,473,915 | 10/1969 | Pierret | 75/356 |
| 4,067,736 | 1/1978 | Vartanian | 75/425 |
| 4,149,876 | 4/1979 | Rerat | 75/363 |
| 4,483,819 | 11/1984 | Albrecht et al. | 75/245 |
| 4,512,805 | 4/1985 | Albrecht et al. | 75/244 |
| 4,684,399 | 8/1987 | Bergman et al. | 75/363 |
| 4,740,238 | 4/1988 | Schiele . | |
| 4,804,147 | 2/1989 | Hooper | 241/3 |
| 4,968,481 | 11/1990 | Rerat | 419/23 |
| 5,211,741 | 5/1993 | Fife | 75/255 |
| 5,217,526 | 6/1993 | Fife | 75/229 |
| 5,234,491 | 8/1993 | Chang | 75/363 |

FOREIGN PATENT DOCUMENTS

| | | |
|---|---|---|
| 3840361A1 | 6/1989 | Germany . |
| WO 93/03191 | 2/1993 | WIPO . |

OTHER PUBLICATIONS

European Search Report Apr. 25, 1997.
"Tantalum Powder Developments and Thier Influence on Tantalum Capacitors" by Dr. K. Anderson, H. Naito, and Dr. T. B. Tripp. *Carts Europe 92*, pp. 1–6.
English Translation. Tabata, A: Today's Trends In Capacitor Technology. *NEC Giho (NEC Technical Bulletin)*, vol. 47, No. 10, pp. 66–70, 1994.
English Translation. Taniguchi, H. M. Fujiwara, T. Fukaumi, A. Kobayashi, T. Nishiyama and M. Ooi: Movement Toward Impedance Reduction of Tantalum Capacitors, *NEC Giho (NEC Technical Bulletin)*, vol. 47, No. 10, pp. 86–89, 1994.
English Translation, Take, S. and H. Sato: Minaturization of Tantalum Capacitors, *NEC Giho (NEC Technical Bulletin)*, vol. 47, No. 10, pp. 71–75, 1994.

*Primary Examiner*—Hyung-Sub Sough
*Assistant Examiner*—Anthony Dinkins
*Attorney, Agent, or Firm*—Ratner & Prestia

[57] ABSTRACT

A capacitor having a central electrode body having sintered metal anode with an electrode lead, the anode having a sintered product produced from a tantalum powder having deagglomerated particles such that the product of the volume mean diameter in microns multiplied by the specific surface area measured in m²/g is a number in the range of below about 25. Capacitors having a central electrode with the anode produced from a sintered product produced from a heat treated and oxidized tantalum powder wherein the oxidized particle size is greater than about 0.7 m²/g. Capacitors are defined in terms of anodes produced from powders having specified ratios of Scott Bulk Density to surface area or ratio of die fill rate to surface area.

7 Claims, 14 Drawing Sheets

TANTALUM METAL POWER WITH CONTROLLED SIZE DISTRIBUTION AND PRODUCTS MADE THEREFROM

This application is a divisional of U.S. patent application Ser. No. 08/638,922, filed Apr. 25, 1996.

FIELD OF THE INVENTION

This invention relates to a process of sizing tantalum metal powders, and to the powders produced thereby. More particularly, the invention relates to a process of sizing tantalum powder and to tantalum powder suitable for use in making sintered porous bodies, useful for example as capacitor electrodes.

BACKGROUND OF THE INVENTION

Among its many applications, tantalum powder is generally used to produce capacitor electrodes.

Tantalum capacitor electrodes, in particular, have been a major contributor to the miniaturization of electronic circuits. Such capacitor electrodes typically are manufactured by compressing agglomerated tantalum powder to less than half of the metal's true density with an electrode lead wire to form a pellet, sintering the pellet in a furnace to form a porous body (i.e., an electrode), and then subjecting the porous body to anodization in a suitable electrolyte to form a continuous dielectric oxide film on the sintered body. The anodized porous body is then impregnated with a cathode material, connected to a cathode lead wire and encapsulated.

The primary particle size and the agglomerated size (agglomerates are clusters of smaller primary particles), and the primary particle size and agglomerated size distributions of a powder, are important factors in the efficiency and efficacy of the subsequent sintering process by which porous bodies are made therefrom and in the electrical characteristics of the functional products, such as electrolytic capacitors, in which such porous bodies are incorporated.

In attempts to achieve a tantalum metal powder having the desirable characteristics for making capacitor electrodes and similar products, prior art powders were limited by the processes by which they were produced. Currently, for example, tantalum powders are generally produced via one of two methods: a mechanical process or a chemical process. The mechanical process includes the steps of electron beam melting of tantalum to form an ingot, hydriding the ingot, milling the hydride, and then dehydriding, crushing, and heat treating. This process generally produces powder with high purity, which is used in capacitor applications where high voltage or high reliability is required. The mechanical process suffers, however, from high production costs. In addition, tantalum powders produced by the mechanical process generally have low surface area.

The other generally utilized process for producing tantalum powder is a chemical process. Several chemical methods for producing tantalum powders suitable for use in capacitors are known in the art. U.S. Pat. No. 4,067,736, issued to Vartanian, and U.S. Pat. No. 4,149,876, issued to Rerat, disclose in detail the chemical production process involving sodium reduction of potassium fluorotantalate, $K_2TaF_7$. A review of typical techniques is also described in the background sections of U.S. Pat. No. 4,684,399, issued to Bergman et al., and U.S. Pat. No. 5,234,491, issued to Chang.

Tantalum powders produced by chemical methods are well-suited for use in capacitors because they generally have larger surface areas than powders produced by mechanical methods. The chemical methods generally involve the chemical reduction of a tantalum compound with a reducing agent. Typical reducing agents include hydrogen and active metals such as sodium, potassium, magnesium, and calcium. Typical tantalum compounds include, but are not limited to, potassium fluorotantalate ($K_2TaF_7$), sodium fluorotantalate ($Na_2TaF_7$), tantalum pentachloride ($TaCl_5$), tantalum pentafluoride ($TaF_5$), and mixtures thereof. The most prevalent chemical process is the reduction of $K_2TaF_7$ with liquid sodium.

The chemically reduced powder which results is referred to herein as "basic lot powder" and typically comprises agglomerates or clusters of smaller primary tantalum particles. These clusters or agglomerates are referred to herein as "basic lot agglomerates." The primary particle sizes of these basic lot agglomerates generally range from about 0.1 to about 5 microns in size. The size distribution for basic lot agglomerates for a conventional tantalum powder is shown in FIG. 1 as a comparative example. The basic lot agglomerate size distribution of basic lot powders is typically polydispersed and substantially-bimodal. As defined herein, the term "polydispersed" means a broad distribution with a wide range of values and "bimodal" means a distribution with two modes (i.e., there are two different values which are conspicuously more frequent than neighboring values).

Basic lot powder is typically heat treated, milled, or crushed, and deoxidized such as by reaction with magnesium. The resultant product, sometimes referred to herein as a "heat treated and deoxidized powder" or "finished powder" typically includes some agglomerates, which may be referred to herein as "heat treated and deoxidized agglomerates."

Products of this type may be compressed and sintered to make porous bodies, such as anodes for capacitors. Capacitor electrodes produced from such heat treated and deoxidized powders of tantalum, however, suffer from non-uniform sintering and variable porosity distributions.

The process described above is generally illustrated by the schematic block diagram included as FIG. 15 hereof.

The resultant surface area of a finished tantalum powder is an important factor in the production of capacitors. The charge capability (CV) of a tantalum (for example) capacitor (typically measured as microfarad-volts) is directly related to the total surface area of the anode after sintering and anodization. Capacitors having high surface area anodes are desirable because the greater the surface area, the greater the charge capacity of the capacitor. Greater net surface area can be achieved, of course, by increasing the quantity (grams) of powder per pellet. One way to accomplish this is by pressing larger amounts of tantalum powder to form the porous pellet before sintering. This approach is restricted, however, because there is an inherent limit to the amount of powder which can be compacted into a given pellet size. Pellets pressed with higher than usual compression ratios result in anodes having poor porosity distributions with closed and non-uniform pores. Open, uniform pores are important for the steps of anodizing and impregnating the pellet to form the cathode.

As an alternative to increasing the quantity of tantalum powder used to produce the pellet, development efforts have focused on finding tantalum powders having higher specific surface areas. By increasing the specific surface area of these powders, higher surface area anodes having higher capacitance can be achieved while using smaller amounts of the tantalum powders. These higher capacitance values are typically measured based upon the volume of pellet produced (i.e., CV/cc). As a result, by using high surface area tantalum powders, capacitor sizes can be reduced while achieving the same level of capacitance. Alternatively, a larger capacitance can be achieved for a given capacitor size.

Various tantalum powder process techniques have been practiced which attempt to maximize the production of a powder having desired small primary particle sizes and, therefore, increased surface area. For example, U.S. Pat. No. 4,149,876, issued to Rerat, concerns techniques for controlling surface area of tantalum powder product in a reduction process wherein liquid sodium is added to a molten bath of $K_2TaF_7$ and a diluent salt.

These various other tantalum powder process techniques which produce a powder having increased surface area still result, however, in a finished tantalum powder having a size distribution which is broad and polydispersed.

SUMMARY OF THE INVENTION

The present invention comprises a process for sizing a tantalum powder. The process comprises comminuting a tantalum powder having agglomerates comprising smaller primary particles, such as those produced by chemical reduction, prior to heat treatment (e.g., thermal agglomeration).

In one embodiment, the process of the present invention produces a tantalum powder including agglomerates of smaller particles, which process yields a tantalum powder having an as-comminuted agglomerate size distribution with the product of the Volume Mean Diameter, MV (in microns as measured by light scattering techniques such as Microtrac analysis), times specific surface area, BET ($m^2$/g), being less than about 25.

In a preferred embodiment of the invention, the agglomerates are comminuted to yield a tantalum powder having an as-comminuted agglomerate size distribution within certain limits.

Preferably, the product produced according to the present invention is a tantalum powder having a relatively limited, more preferably unimodal, agglomerate size distribution in all stages of production, namely after sizing (i.e., deagglomeration by comminution), thermal agglomeration (i.e., heat treatment), and deoxidation. This resultant powder has high surface area, high purity, and good flowability properties and, upon sintering, exhibits controlled shrinkage with high porosity.

The present invention also includes sized heat treated basic lot tantalum metal powders having agglomerate particle sizes wherein the product of the Volume Mean Diameter, MV (expressed herein in micrometers), times the specific surface area, BET (expressed, herein, in square meters per gram), is in the range from about 90 to about 250. Sized and agglomerated powders of tantalum which are also deoxidized are also provided wherein the product of the Volume Mean Diameter, MV, times the specific surface area, BET, is in the range from about 90 to about 250.

This invention also encompasses sintered porous bodies made from powders treated in accordance with the present invention, capacitor electrodes made from such powders, and capacitors including such electrodes. Such electrodes and capacitors are as shown (except for the improvement of the present invention) in U.S. Pat. No. 5,217,526, of common assignment herewith, the essential disclosure of which is incorporated herein by reference. In one embodiment such capacitors may be made from basic lot powder treated in accordance with the present invention, at essentially any stage thereof, by techniques as referred and described in that patent at column 4, lines 28–50.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying figures, in which.

DETAILED DESCRIPTION OF THE INVENTION

The entire disclosure of U.S. Pat. No. 08/638,922 filed Apr. 25, 1996 is expressly incorporated by reference herein.

The size distribution ranges discussed below are defined as ranges between the D10 and D90 values of the particular powder being discussed, wherein the D10 and D90 values are defined as the size values at which 10 volume percent and 90 volume percent, respectively, of the particle/agglomerate diameters lie below.

The following testing procedures were used in the determination and evaluation of the analytical properties and the physical properties of the tantalum powders sized according to the process of the present invention. Surface area determinations of the tantalum powder were conducted using the nitrogen Brunauer, Emmett, Teller (BET) process using a Quantachrome Monosorb Surface Analyzer Model MS12. The purity of the tantalum powder was determined using spectrography by methods known in the art having a detection limit of 5 ppm for iron, nickel, chromium, and molybdenum.

All particle sizes discussed herein, except for Sample ID# A2-BDR, were measured by Microtrac analysis using a Leeds & Northrup Microtrac II Model 7998 analyzer without the use of a dispersant. The procedure comprised the steps of adding deionized water to the sample reservoir and then taking a background reading. The tantalum powder to be measured was added to the sample reservoir until the loading index window of the analyzer indicated a sample concentration of 0.88+/-0.02 (T) at which time the particle size reading was taken and immediately reported. The particle size distribution for Sample ID# A2-BDU was measured by Microtrac analysis using a Leeds & Northrup Microtrac II Model 7998 as described above but with the particles dispersed using ultrasonic sound waves. The particle sizes of Sample ID# A2-BDR were measured using a Malvern Instruments MasterSizer X Ver. 1.2b.

The present invention is directed to the sizing of tantalum powders comprising agglomerates of smaller particles to produce a tantalum powder having an agglomerate size distribution with a Volume Mean Diameter times specific surface area (MV×BET) which is in the range from about 90 to about 250. The sized tantalum powders of the present invention are particularly adapted for use in capacitors. Preferably, the sized powders produced according to the present invention are tantalum powders having an agglomerate size distribution which is narrow, and more preferably unimodal.

Figure 13:
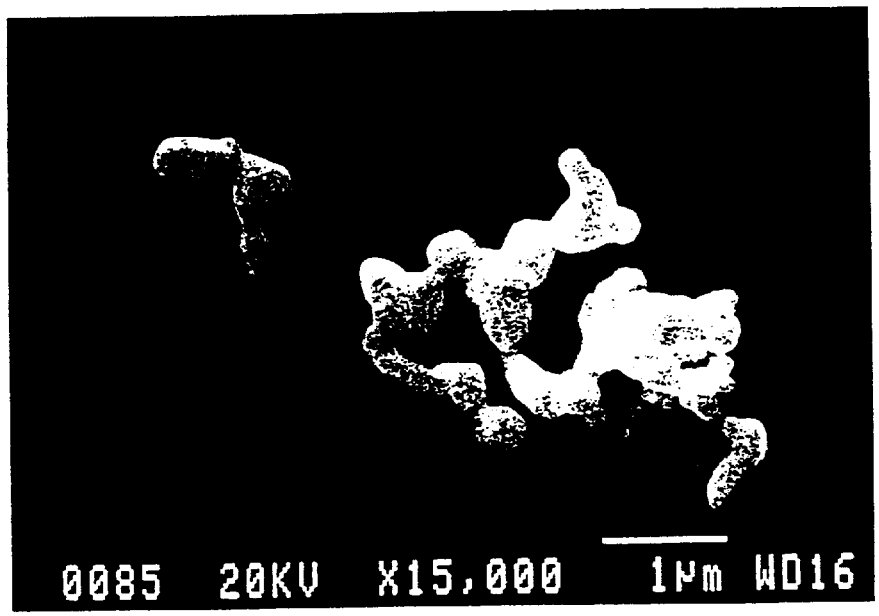
FIG. 13 shows a scanning electron micrograph of a basic lot tantalum powder without sizing which corresponds to Sample ID# A2-B.
Figure 14:
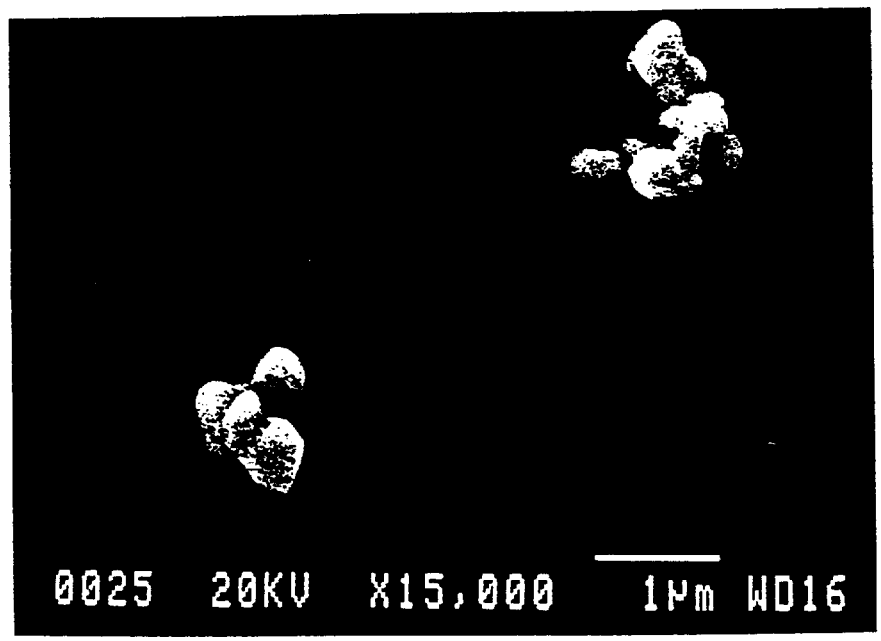
FIG. 14 shows a scanning electron micrograph of a basic lot tantalum powder after sizing according to the present invention which corresponds to Sample ID# A2-BD.

In one embodiment the sizing process of the present invention comprises the step of taking a basic lot powder comprising tantalum having basic lot agglomerates and achieving an agglomerate size distribution which is narrow, at any point in the process prior to (immediately or otherwise) performing any heat treating or sintering operation. Preferably, this step is accomplished by comminuting a basic lot powder of tantalum to produce an as-comminuted powder having a comminuted agglomerate size from about 0.01 to about 20 micrometers with a median size of about 3 to 5 micrometers. These basic lot agglomerate sizes after comminution can be seen in FIG. 14 which is a scanning electron micrograph taken at a magnification of 15,000× of a basic lot powder of tantalum sized according to the Sample ID# A2-BD. As a comparison, FIG. 13 shows a scanning electron micrograph taken at a magnification of 15,000× of a basic lot powder of tantalum corresponding to Sample ID# A2-B which is not sized. It can be seen from these micrographs that powders sized according to the process of the present invention have much smaller and more uniform agglomerate sizes which comprise a smaller number of primary particles.

Figure 1:
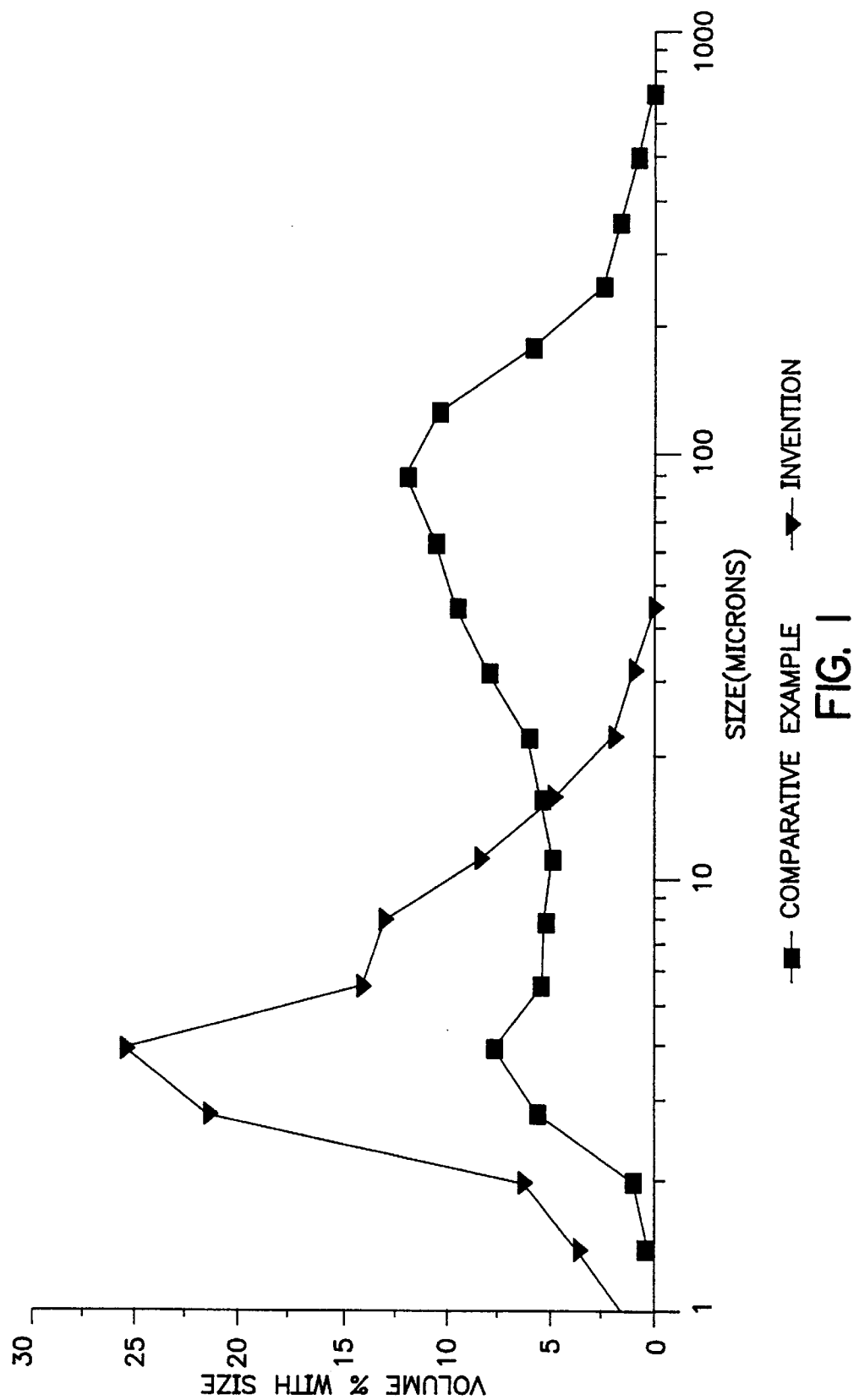
FIG. 1 shows the narrow, substantially unimodal size distribution of basic lot agglomerates achieved by comminuting basic lot powders according to the present invention as compared with the polydispersed and substantially bimodal distribution of basic lot agglomerates in basic lot powders without comminution.
Figure 2:
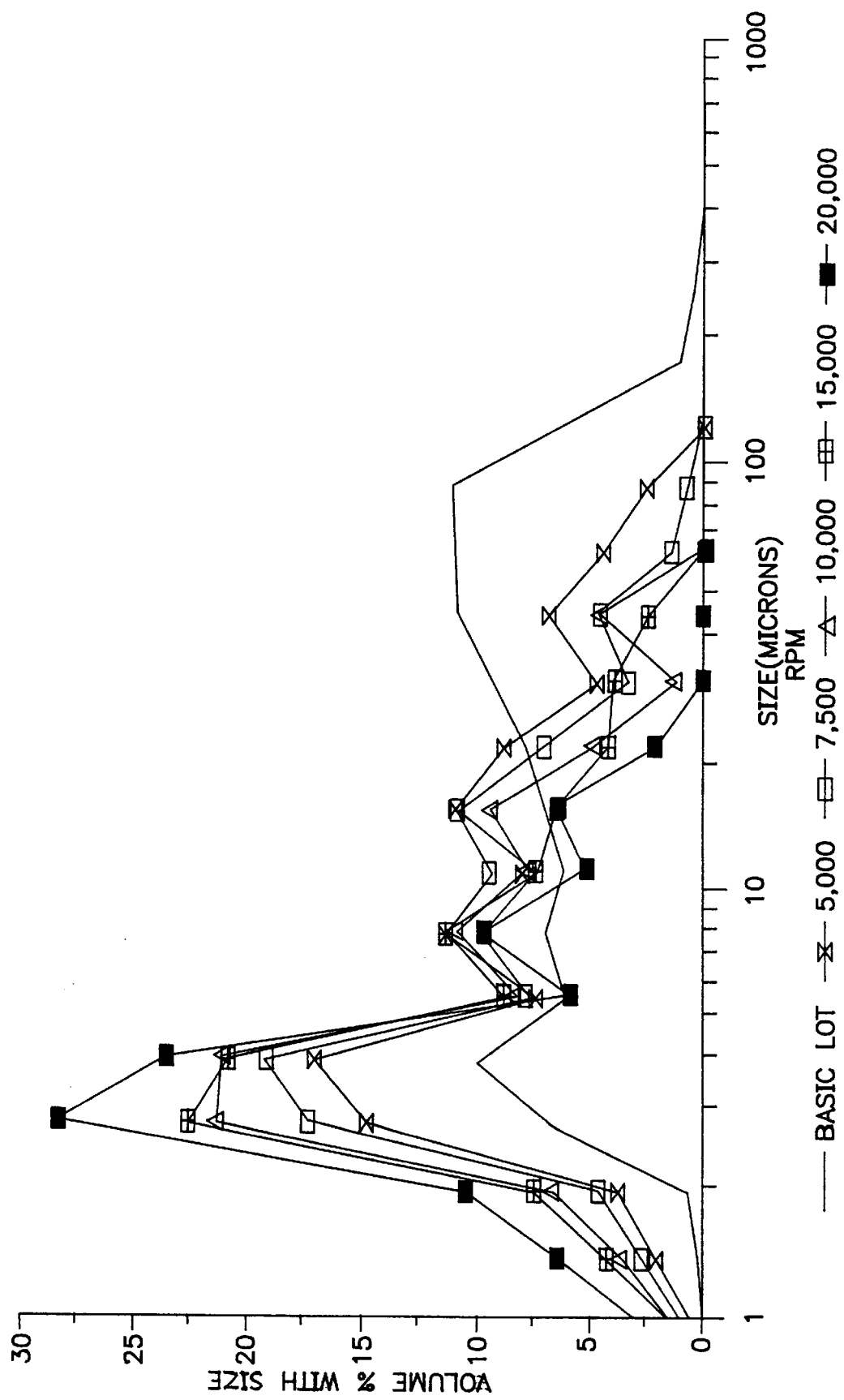
FIG. 2 shows the variation in basic lot size distributions according to a process of the present invention as a function of rotational speed of a Vortec milling apparatus as compared with the polydispersed distribution of basic lot agglomerates not treated in accordance with the present invention.

FIG. 1 shows the narrow and unimodal basic lot agglomerate size distribution achieved by the process of the present invention using a Waring Model 31BL40 high-speed laboratory blender as a high shear apparatus to accomplish wet comminution. FIG. 2 shows the narrow basic lot agglomerate size distribution achieved by the process of the present invention using a Vortec impact milling apparatus to accomplish dry comminution. These distributions permit the subsequent thermal agglomeration (i.e., heat treating) of powders and sintering of compacts to be done in a controlled fashion. According to the present invention, high shear comminution methods are most preferred because they produce powders having size distributions which are both narrow and unimodal as shown in FIG. 1. These high shear methods are accomplished using apparatus having high velocity blades which rotate at velocities sufficient to create mechanical and hydraulic shear stresses to break down metallurgically bonded particles. Typically, the tip velocities employed are from about 3000 to about 4000 feet per minute. Although less preferred, it is discovered that impact comminution methods according to the present invention are also effective because they produce powders having size distributions as shown in FIG. 2 which, although not entirely unimodal, are still narrow such that the attendant benefits discussed herein are realized.

Figure 4:
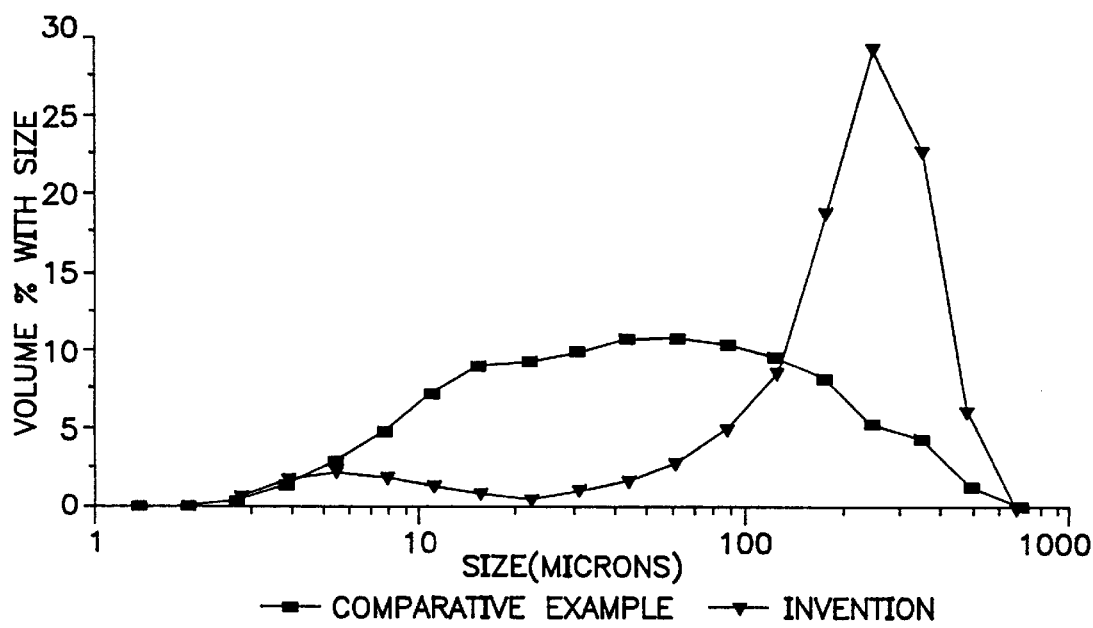
FIG. 4 shows the variation in heat treated and deoxidized agglomerate size distributions of finished powders achieved by thermally agglomerating and deoxidizing a sized basic lot powder according to a process of the present invention as compared with heat treated and deoxidized agglomerate size distributions of finished powders which result from thermally agglomerating and deoxidizing basic lot powders without sizing.
Figure 7:
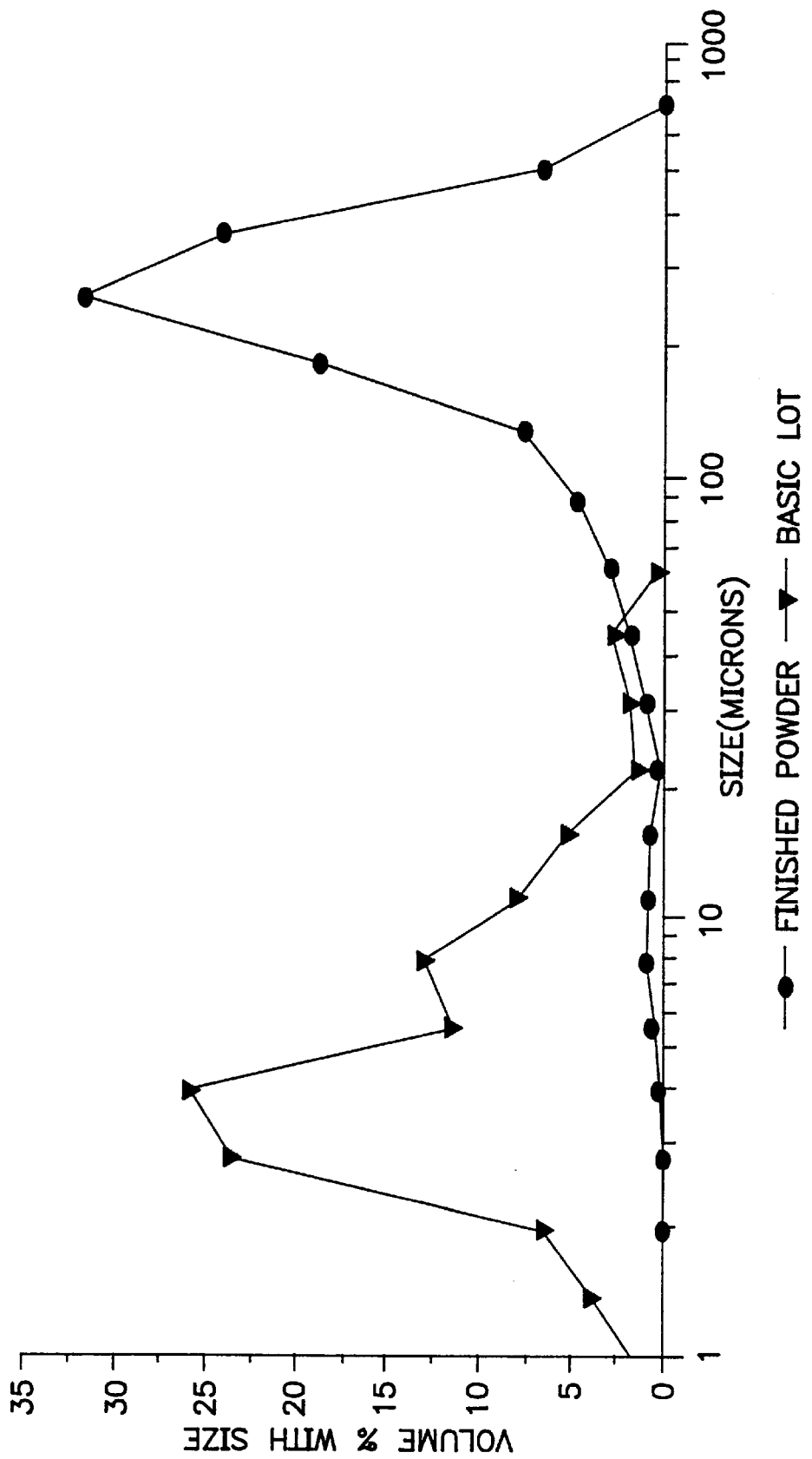
FIG. 7 compares basic lot agglomerate size distributions of a basic lot powder which has been sized according to the present invention, before and after thermal agglomeration and deoxidation according to the present invention.

FIG. 4 shows the agglomerate size distribution of a finished powder made by a conventional process (the "comparative example" curve) and the agglomerate size distribution of a finished powder made from sized basic lot powder according to the present invention (using a high shear mixer). The conventional process results in a polydispersed distribution whereas the process of the present invention results in a narrow distribution having a fine "tail" which constitutes a small volume percentage of the entire distribution. FIG. 7 shows the narrow basic lot agglomerate size distributions resulting from basic lot powders which have been sized according to the present invention and the narrow and unimodal agglomerate size distributions resulting from basic lot powders which have been sized, thermally agglomerated, and deoxidized according to the present invention.

As discussed above, in order to achieve uniform sintering and preserve maximum surface area, metal powders having narrow agglomerate size distributions are preferred with narrow and unimodal distributions being most preferred. In addition, because capacitor manufacturers press and sinter these powders into smaller pellet sizes, controlled shrinkage and porosity are important. It has been discovered that powders treated according to the present invention yield finished powders having a narrow, and more preferably a narrow and unimodal, size distribution which facilitates better control of sintering than conventional powders having a polydispersed size distribution. A unimodal size distribution is defined as those size distributions having profiles similar to those, for example, shown for the finished powders according to the present invention in FIGS. 4 and 5.

Because shrinkage is a function of particle diameter, powders with wide particle size distributions typically result in varying amounts of shrinkage in an anode which can result in a large degree of non-uniformity and closed pores. It is theorized that, because the powders have narrow particle size distributions, uniform shrinkage would result in anodes produced from these powders. Thus, capacitors produced from powders made according to the present invention should exhibit controlled shrinkage with high porosity and uniform pore size distribution as compared with capacitors produced using conventional polydispersed tantalum powders.

The comminution process of the present invention is performed by subjecting a tantalum powder comprising agglomerates of smaller particles to high shear or impact stresses under either wet or dry conditions. The following examples illustrate both wet and dry comminuting methods according to the present invention. It is to be understood that, although the preferred metal powders to be sized are basic lot powders of tantalum produced by a chemical reduction process, it is contemplated that other metal powders produced by other methods can be sized by the process as disclosed herein. Thus, the present invention is not limited to the particular examples set forth below, but can be used in conjunction with other metal powders as will be readily ascertainable to a person having ordinary skill in the art.

The basic lot powders of tantalum to be sized in the following examples, i.e., the agglomerates of smaller particles produced directly upon chemical reduction, were produced using a conventional sodium reduction process as discussed in the background section above. The basic lot agglomerates generally fell into two primary particle size ranges, each having a polydispersed, substantially bimodal basic lot agglomerate size distribution. Five basic lot powders having high surface areas (labelled as lots A1, A2, A3, A4, and A5) were prepared having basic lot agglomerate size distributions ranging from about 2 to about 132 microns. To determine the effect of primary particle sizes in the basic lot powders, a sixth basic lot powder (labelled as Bi) was also prepared which had a basic agglomerate size distribution ranging from about 5 to about 95 microns. The size distributions and Scott density data for these basic lot powders are shown in Table 2.

It is to be understood that, although the particle size distribution data and the figures are shown having a lower limit of "1," the present invention is not intended to be limited thereby. This is due to the inability of the Leeds & Northrup Microtrac II Model 7998 to measure particle sizes smaller than 1 micrometer. Sample A2-BDR measured using the Malvern Instruments MasterSizer X Ver. 1.2b (capable of measuring down to 0.02 micrometers) is provided as an example which illustrates the lower size ranges which can be achieved by the present invention. The basic lot powders were then divided into sample lots and comminuted as described below.

I. Wet Comminution Methods

A) Wet Comminution Using a Waring Laboratory Blender

One hundred gram samples of basic lot powders A3 and A4 were each separately mixed with 500 ml of cold (i.e., room temperature), deionized water and comminuted in a Waring Model 31BL40 high-speed laboratory blender. The powder and water mixtures were comminuted at the highest rpm setting (20,000 rpm) for 10 minutes. This process was repeated until 50 lbs of sized powder were produced. The resultant sheared powder was then filtered, acid leached, rinsed, dried, and divided into samples which were then heat treated at different thermal agglomeration temperatures. The heat treatment cycles used on samples taken from lot A3 (Sample ID# A3-BD) were 1200° C. for 60 minutes (Sample ID# A3-BDH1), 1250° C. for 60 minutes (Sample ID# A3-BDH2), and 1350° C. for 60 minutes (Sample ID# A3-BDH3). A sample from lot A4 (Sample ID# A4-BD) was heat treated at 1230° C. for 60 minutes (Sample ID# A4-BDH1). Properties of the basic lot powders before and after heat treatment are shown in Table 2 with derived parameters being tabulated in Table 3.

B) Wet Comminution Using a Ross Laboratory High-Shear Model 100 LC Mixer

Two thousand five hundred ml of cold, deionized water were placed in a one-liter, stainless steel beaker. The stainless steel beaker was then placed in an ice bath and under the rotor of a Ross 100 LC mixer set at 500 rpm. One thousand grams of each of basic lot powders A1 and B1 were slowly added to the deionized water while mixing at 500 rpm. The mixer speed was increased to the highest setting (10,000 rpm) and blended for a total of about 60 minutes. Ice was continually added to keep the bath cold. The powder was then filtered, leached with a mixture of acids (e.g., dilute aqua regia) to remove any contaminants, and dried.

The resultant sheared powders were then divided into samples which were heat treated at different thermal agglomeration temperatures. The heat treatment cycles used on samples taken from lot B1 (Sample ID# B1-BD) were 1400° C. for 30 minutes (Sample ID# B1-BDH3) and 1500° C. for 30 minutes (Sample ID# B1-BDH4). A sample from lot A1 (Sample ID# A1-BD) was heat treated at 1200° C. for 30 minutes (Sample ID# A1-BDH1). Properties of the basic lot powders before and after heat treatment are shown in Table 2 with derived parameters being tabulated in Table 3.

C. Wet Comminution Using a Commercial Grade Ross Model 105ME High Shear Mixer

Ten gallons of deionized water were placed in a container under the rotor of a Ross 105 ME/mixer set at 500 rpm. Fifty pounds of basic lot powder A2 were slowly added to the deionized water while mixing at the highest speed (about 3000 rpm, which corresponds to a tip speed of 3500 feet per minute). Blending was continued for a total of about 90 minutes at which time the water was decanted and the powder filtered. The powder was then washed with a mixture of acids to remove any contaminants.

The resultant sheared powder was then filtered, dried, and divided into samples which were then heat treated at different thermal agglomeration temperatures. The heat treatment cycles used on samples from lot A2 (Sample ID# A2-BD) were 1250° C. for 30 minutes (Sample ID# A2-BDH1) and 1350° C. for 30 minutes (Sample ID# A2-BDH2). Properties of the basic lot powder before and after heat treatment are shown in Table 2 with derived parameters being tabulated in Table 3. For basic lot powder A2, the particle size distribution for Sample ID# A2-BD was measured by a standard Microtrac analysis which measures the scattering of a laser light directed through a suspension of the powder in water.

D) Ball Milling of a Wet Basic Lot Powder

A one-gallon ball mill was filled half full with ½-inch diameter stainless steel balls. Six hundred ml of water and 285 g of basic lot powder were then added. The ball mill was then tumbled for 16 hours and the resultant tantalum powder was washed and filtered.

II. Dry Comminution Methods

A water-washed, acid-leached, and dried basic lot powder A5, made according to a conventional sodium reduction process, was obtained. A powder was selected having a high hydrogen concentration (preferably above 1500 ppm although powders having lower concentrations may be used) so that it was brittle. The data for this starting basic lot powder is shown below in Table 1. The basic lot powder was milled by single-pass Vortec milling in an M1 mill with product collected in a cyclone recovery system. Five pound lots of the A5 basic lot powder were processed at each of the following selected machine speeds: 5,000; 7,500; 10,000; 15,000; and 20,000 rpm.

The Scott density, oxygen content, D10, D50, D90, and Volume Mean Diameter (MV) data of the Vortec-milled samples are shown in Table 1 below:

TABLE 1

| ID | RPM | Scott g/in$^3$ | D10 microns | D50 microns | D90 microns | MV microns |
|---|---|---|---|---|---|---|
| A5-B | Starting Basic Lot | 15.2 | 3.03 | 20.95 | 81.29 | 32.31 |
| A5-BD1 | 5000 | 18.8 | 2.13 | 6.56 | 37.21 | 13.21 |
| A5-BD2 | 7500 | 22.7 | 2.02 | 4.96 | 21.48 | 9.34 |
| A5-BD3 | 10000 | 21.1 | 1.81 | 3.68 | 15.68 | 7.11 |
| A5-BD4 | 15000 | 24.0 | 1.71 | 3.54 | 15.91 | 6.64 |
| A5-BD5 | 20000 | 27.5 | 1.44 | 2.87 | 9.92 | 4.26 |

Figure 3:
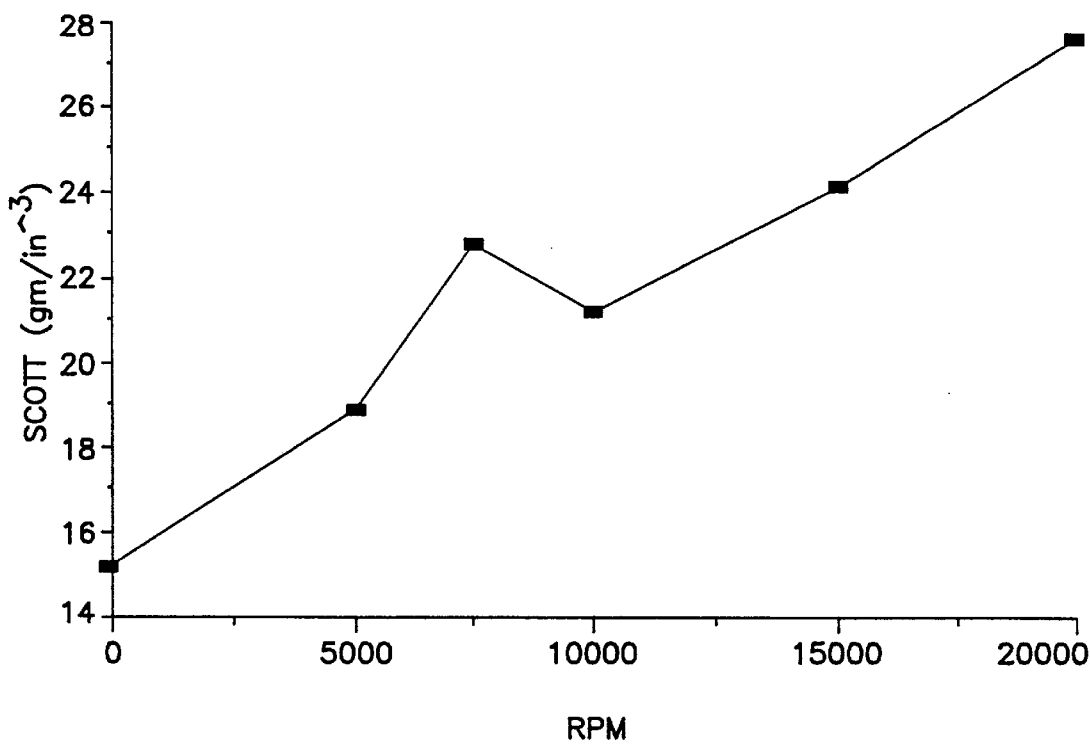
FIG. 3 shows the variation in Scott Bulk Densities of basic lot powders which are sized according to a process of the present invention as a function of rotational speed of a Vortec milling apparatus.

The size distribution ranges for these Vortec-milled powders are shown in FIG. 2 with the Scott densities illustrated in FIG. 3.

Although the process of the present invention is illustrated using the various comminution methods described above, it is envisioned that other comminution methods such as ultrasonic milling and jet milling can also be employed.

III. Deoxidation of the Comminuted and Heat Treated Lots

Samples were taken from each of comminuted and heat-treated basic lot powders from lots A1, A2, A3, A4, and B1 and subjected to a magnesium deoxidation treatment. In this treatment a small amount of magnesium metal powder (i.e., 1–2 weight percent) is blended with the heat treated tantalum powder. The mixture is heated from about 800 to about 1000° C. to react the magnesium with and reduce the oxygen contained in the finished tantalum powder. The tantalum powder is subsequently leached and dried. The raw data corresponding to these powders in all stages of production (i.e., for the as-reduced basic lot powder, after sizing, after heat treating, and after deoxidizing) are shown in Table 2 below. Derived parameters are shown in Table 3.

The sample identification numbers in the tables consist of a prefix which refers to the basic lot powder number and a suffix indicating the treatments performed on the tantalum powders. The identification numbers are abbreviated as follows:

B = a basic lot powder;
BD = a basic lot powder which has been sized;
BDH# = a basic lot powder which has been sized and heat treated (the heat treatment # is carried throughout the subsequent processing steps to the sample);
BDH#M = a basic lot powder which has been sized, heat treated, and deoxidized;
BDH#MS = a basic lot powder which has been sized, heat treated, deoxidized, and screened to about 500 mesh; and
BH#M = a basic lot powder which has been heat treated and deoxidized.

Thus, as an example, sample ID# A4-BDH1M is a basic lot powder from lot A4 which has been sized, heat treated at 1230° C. for 60 minutes, and deoxidized.

TABLE 2

| | Sample ID | BET m$^2$/g | D10 μm | D50 μm | D90 μm | MV μm | Die Fill mg/s | Scott g/in$^3$ |
|---|---|---|---|---|---|---|---|---|
| Basic Lot | A1-B | 1.13 | 2.61 | 13.86 | 69.26 | 25.43 | | 17 |
| Basic Lot | A2-B | 1.17 | 3.31 | 26.28 | 93.64 | 37.68 | | 16 |
| Basic Lot | B1-B | 0.95 | 5.14 | 33.56 | 95.31 | 42.20 | | 19 |
| Basic Lot | A3-B | 1.14 | 3.27 | 21.55 | 79.09 | 32.15 | | 13 |
| Basic Lot | A4-B | 1.32 | 3.20 | 33.26 | 131.88 | 53.05 | | 14 |
| DA Ross 100LC | A1-BD | 1.14 | 1.77 | 3.67 | 13.58 | 5.91 | | 33 |
| DA Ross 105ME | A2-BD | 1.18 | 2.14 | 5.33 | 18.41 | 8.75 | | 32 |
| DA Ross 105ME | A2-BDU | 1.18 | 1.39 | 2.94 | 10.28 | 4.52 | | 32 |
| DA Ross 100LC | B1-BD | 0.99 | 2.04 | 5.81 | 15.53 | 7.39 | | 32 |
| DA Waring | A3-BD | 1.10 | 1.81 | 3.44 | 10.53 | 5.41 | | 31 |
| DA Waring | A4-BD | 1.33 | 1.83 | 3.54 | 9.89 | 4.86 | | 25 |
| DA Ross 105ME | A2-BDR | 1.18 | 0.19 | 0.41 | 0.98 | 0.41 | | |
| HT 1200° C. 30 min | A1-BDH1 | 0.92 | 10.32 | 201.56 | 347.14 | 193.13 | | 38 |
| HT 1250° C. 30 min | A2-BDH1 | 0.70 | 7.58 | 111.69 | 299.71 | 129.58 | | 27 |
| HT 1350° C. 30 min | A2-BDH2 | 0.51 | 13.62 | 135.56 | 300.05 | 142.32 | | 33 |
| HT 1400° C. 30 min | B1-BDH3 | 0.47 | 10.47 | 132.39 | 301.55 | 138.29 | | 42 |
| HT 1500° C. 30 min | B1-BDH4 | 0.33 | 17.83 | 158.38 | 326.34 | 162.97 | | 49 |
| HT 1200° C. 60 min | A3-BDH1 | 0.89 | 3.61 | 107.77 | 286.50 | 122.56 | | 28 |
| HT 1250° C. 60 min | A3-BDH2 | | 43.54 | 204.71 | 345.33 | 200.67 | | 34 |
| HT 1350° C. 60 min | A3-BDH3 | 1.22 | | | | | | 38 |
| HT 1230° C. 60 min | A4-BDH1 | | 4.68 | 101.39 | 289.86 | 121.50 | | 26 |
| Deoxidized | A1-BDH1M | 1.07 | 11.71 | 203.74 | 346.79 | 198.24 | 142 | 48 |
| Deoxidized | A2-BDH1M | 0.71 | 8.26 | 156.63 | 329.59 | 156.89 | 25 | 35 |

TABLE 2-continued

| | Sample ID | BET m^2/g | D10 μm | D50 μm | D90 μm | MV μm | Die Fill mg/s | Scott g/in^3 |
|---|---|---|---|---|---|---|---|---|
| Deoxidized | A2-BDH2M | 0.60 | 12.04 | 159.41 | 314.09 | 157.19 | 80 | 41 |
| Deoxidized | B1-BDH3M | 0.55 | 10.77 | 137.89 | 327.98 | 149.97 | 142 | 45 |
| Deoxidized | B1-BDH4M | 0.42 | 21.74 | 190.31 | 356.62 | 190.17 | 302 | 52 |
| Deoxidized | A3-BDH1M | 0.96 | 46.46 | 207.90 | 339.10 | 202.48 | 63 | 38 |
| Deoxidized | A3-BDH2M | 0.92 | 44.9 | 192.64 | 331.1 | 190.73 | 160 | 40 |
| Deoxidized | A3-BDH3M | 0.68 | 73.43 | 202.92 | 335.94 | 203.65 | 632 | 47 |
| Deoxidized | A4-BDH1M | 1.07 | 5.89 | 142.92 | 316.67 | 146.99 | | 31 |
| Screened | A3-BDH1MS | | 85.16 | 212.55 | 342.1 | 214.29 | 345 | |
| Screened | A3-BDH2MS | | 84.92 | 199.96 | 333.94 | 204.14 | 634 | |

TABLE 3

| | Sample ID | BET X MV | Flow/BET | Scott/BET |
|---|---|---|---|---|
| Basic Lot | A1-B | 29 | | 15 |
| Basic Lot | A2-B | 44 | | 14 |
| Basic Lot | B1-B | 40 | | 20 |
| Basic Lot | A3-B | 37 | | 11 |
| Basic Lot | A4-B | 70 | | 11 |
| DA Ross 100 LC | A1-BD | 7 | | 29 |
| DA Ross 105 ME | A2-BD | 10 | | 27 |
| DA Ross 105 ME | A2-BDU | 5 | | 27 |
| DA Ross 100 LC | B1-BD | 7 | | 32 |
| DA Waring | A3-BD | 6 | | 28 |
| DA Waring | A4-BD | 6 | | 19 |
| DA Ross 105ME | A2-BDR | 0.48 | | |
| HT 1200 C 30 min | A1-BDH1 | 178 | | |
| HT 1250 C 30 min | A2-BDH1 | 91 | | |
| HT 1350 C 30 min | A2-BDH2 | 73 | | |
| HT 1400 C 30 min | B1-BDH3 | 65 | | |
| HT 1500 C 30 min | B1-BDH4 | 54 | | |
| HT 1200 C 60 min | A3-BDH1 | 109 | | |
| HT 1250 C 60 min | A3-BDH2 | | | |
| HT 1350 C 60 min | A3-BDH3 | | | |
| HT 1230 C 60 min | A4-BDH1 | | | |
| Deoxidized | A1-BDH1M | 212 | 133 | 45 |
| Deoxidized | A2-BDH1M | 111 | 35 | 49 |
| Deoxidized | A2-BDH2M | 94 | 133 | 68 |
| Deoxidized | B1-BDH3M | 82 | 258 | 82 |
| Deoxidized | B1-BDH4M | 80 | 719 | 124 |
| Deoxidized | A3-BDH1M | 194 | 66 | 40 |
| Deoxidized | A3-BDH2M | 183 | 167 | 42 |
| Deoxidized | A3-BDH3M | 138 | 929 | 69 |
| Deoxidized | A4-BDH1M | 135 | | |
| Screened | A3-BDH1MS | | | |
| Screened | A3-BDH2MS | | | |

Table 4 below tabulates the properties of comparative basic lot powder samples of tantalum which are not sized. These samples were produced by the conventional sodium reduction process of potassium fluorotantalate ($K_2TaF_7$) as described above. Table 5 below shows derived parameters of these comparative samples produced by the conventional powder process without comminution.

TABLE 4

| ID | D10 μm | D50 μm | D90 μm | MV μm | BET m^2/g | Scott g/in^3 | Flow mg/s |
|---|---|---|---|---|---|---|---|
| E1-BHM | 16.32 | 66.25 | 203.42 | 88.10 | 0.48 | | |
| E2-BHM | 16.19 | 60.83 | 186.35 | 82.86 | 0.48 | | |
| E3-BHM | 17.03 | 65.26 | 187.64 | 86.11 | 0.48 | | |
| E4-BHM | 15.97 | 60.67 | 173.11 | 79.82 | 0.48 | | |
| D1-BHM | 15.62 | 63.05 | 183.27 | 83.69 | 0.65 | | |
| D2-BHM | 17.78 | 74.88 | 218.59 | 96.22 | 0.65 | | |
| D3-BHM | 14.43 | 59.09 | 166.74 | 76.69 | 0.65 | | |
| D4-BHM | 15.44 | 70.75 | 258.86 | 105.93 | 0.65 | | |
| D5-BHM | 15.60 | 60.62 | 234.64 | 94.80 | 0.65 | | |
| D6-BHM | 18.14 | 73.83 | 206.59 | 92.87 | 0.65 | | |
| C1-BHM | 13.29 | 57.88 | 207.18 | 84.06 | 0.45 | | |
| C2-BHM | 11.59 | 46.63 | 140.04 | 61.77 | 0.45 | | |
| C3-BHM | 13.19 | 54.82 | 179.08 | 78.26 | 0.45 | | |
| C4-BHM | 13.02 | 53.82 | 178.02 | 77.19 | 0.45 | | |
| B2-BHM | 10.75 | 46.40 | 153.56 | 65.50 | 0.66 | | |
| B3-BHM | 10.77 | 48.21 | 164.18 | 69.77 | 0.66 | | |
| B4-BHM | 10.81 | 47.87 | 162.79 | 69.14 | 0.66 | | |
| B5-BHM | 9.98 | 42.36 | 161.64 | 65.81 | 0.66 | | |
| B6-BHM | 10.62 | 47.54 | 174.59 | 71.40 | 0.66 | | |
| B7-BHM | 10.71 | 49.00 | 190.63 | 75.12 | 0.66 | | |
| A5-BH1M | 9.44 | 44.31 | 202.52 | 75.82 | 0.82 | 24.58 | 61 |
| A5-BH1M | 8.98 | 44.39 | 204.32 | 76.19 | 0.87 | 26.71 | 66 |
| A5-BH2M | 10.04 | 44.02 | 174.78 | 71.31 | 0.65 | 27.19 | 80 |
| A5-BH2M | 10.21 | 62.41 | 259.05 | 101.93 | 0.82 | 27.83 | 96 |
| A5-BH3M | 11.81 | 64.22 | 240.37 | 97.74 | 0.68 | 34.83 | 137 |
| A5-BH3M | 16.08 | 95.97 | 283.58 | 123.93 | 0.61 | 40.42 | 251 |
| A5-BH4M | 15.24 | 107.35 | 290.80 | 130.06 | 0.52 | 41.26 | 186 |
| A5-BH4M | 13.96 | 76.85 | 243.71 | 104.75 | 0.56 | 43.81 | 244 |
| A5-BH1M | 9.44 | 50.64 | 204.68 | 79.76 | 0.74 | 30.91 | 107 |
| A5-BH1M | 10.87 | 62.58 | 247.03 | 99.24 | 0.85 | 29.01 | 95 |
| A5-BH2M | 11.13 | 49.67 | 199.15 | 77.61 | 0.67 | 32.31 | 137 |
| A5-BH2M | 10.92 | 57.39 | 233.37 | 92.66 | 0.71 | 32.84 | 132 |
| A5-BH3M | 16.61 | 108.95 | 281.18 | 128.57 | 0.61 | 39.69 | 209 |
| A5-BH3M | 12.27 | 54.99 | 216.16 | 84.70 | 0.54 | 44.78 | 263 |
| A5-BH4M | 20.67 | 108.85 | 301.13 | 134.72 | 0.46 | 49.39 | 338 |
| A5-BH4M | 27.04 | 145.72 | 322.44 | 159.47 | 0.52 | 44.92 | 386 |

TABLE 5

| ID | MV*BET | Scott/BET | Flow/BET |
|---|---|---|---|
| E1-BHM | 42 | | |
| E2-BHM | 40 | | |
| E3-BHM | 41 | | |
| E4-BHM | 38 | | |
| D1-BHM | 54 | | |
| D2-BHM | 63 | | |
| D3-BHM | 50 | | |
| D4-BHM | 69 | | |
| D5-DHM | 62 | | |
| D6-DHM | 60 | | |
| C1-BHM | 38 | | |
| C2-BHM | 28 | | |
| C3-BHM | 35 | | |
| C4-BHM | 35 | | |
| B2-BHM | 43 | | |
| B3-BHM | 46 | | |
| B4-BHM | 46 | | |
| B5-BHM | 43 | | |
| B6-BHM | 47 | | |
| B7-BHM | 50 | | |
| A5-BH1M | 62 | 30 | 75 |
| A5-BH1M | 66 | 31 | 76 |

TABLE 5-continued

| ID | MV*BET | Scott/BET | Flow/BET |
|---|---|---|---|
| A5-BH2M | 46 | 42 | 123 |
| A5-BH2M | 84 | 34 | 117 |
| A5-BH3M | 66 | 51 | 202 |
| A5-BH3M | 76 | 66 | 412 |
| A5-BH4M | 68 | 79 | 357 |
| A5-BH4M | 59 | 78 | 436 |
| A5-BH1M | 59 | 42 | 144 |
| A5-BH1M | 84 | 34 | 112 |
| A5-BH2M | 52 | 48 | 205 |
| A5-BH2M | 66 | 46 | 186 |
| A5-BH3M | 78 | 65 | 343 |
| A5-BH3M | 46 | 83 | 486 |
| A5-BH4M | 62 | 107 | 736 |
| A5-BH4M | 83 | 86 | 743 |

The data of Tables 1, 2, 3, 4, and 5 were used to prepare the graphs of FIGS. 1 to 7 which illustrate the tantalum powders having a narrow agglomerate size distribution in all phases of production.

With regard to the powders subjected to comminution by Vortec milling, analysis of the samples shows that single-pass Vortec milling reduced the basic lot agglomerate size while increasing the Scott density. The comparison of before and after Microtrac analyses is provided in FIG. 2 which shows a shift towards finer basic lot agglomerate sizes after comminution as the rotational speed is increased. As a specific example, comparing the Microtrac analysis of the basic lot powder sample without sizing and the basic lot powder sample sized at 20,000 rpm reveals a size distribution peak at about three microns with virtually no particles larger than 30 microns after Vortec milling whereas the basic lot without sizing shows substantial numbers of agglomerates at 100 microns or greater. The Scott densities achieved after Vortec milling are shown in FIG. 3.

It is observed that Vortec milling is capable of comminuting the large basic lot agglomerates of basic lot powders of tantalum without adversely affecting powder chemistry. Further advantages of the process of the present invention and the powders which result are discussed below.

IV. Basic Lot Chemical Purity

Basic lot powders of tantalum produced by the reduction of $K_2TaF_7$ by sodium in the presence of diluent salts typically have trapped impurities such as Fe, Ni, $Na^+$ and $K^+$. These impurities are detrimental to the electrical performance of tantalum capacitors. Because the sizing process of the present invention breaks down larger basic lot agglomerates, it is believed that trapped impurities are released thereby producing high purity tantalum powders.

V. Improvements in the Flow of Finished Powder

Figure 5:
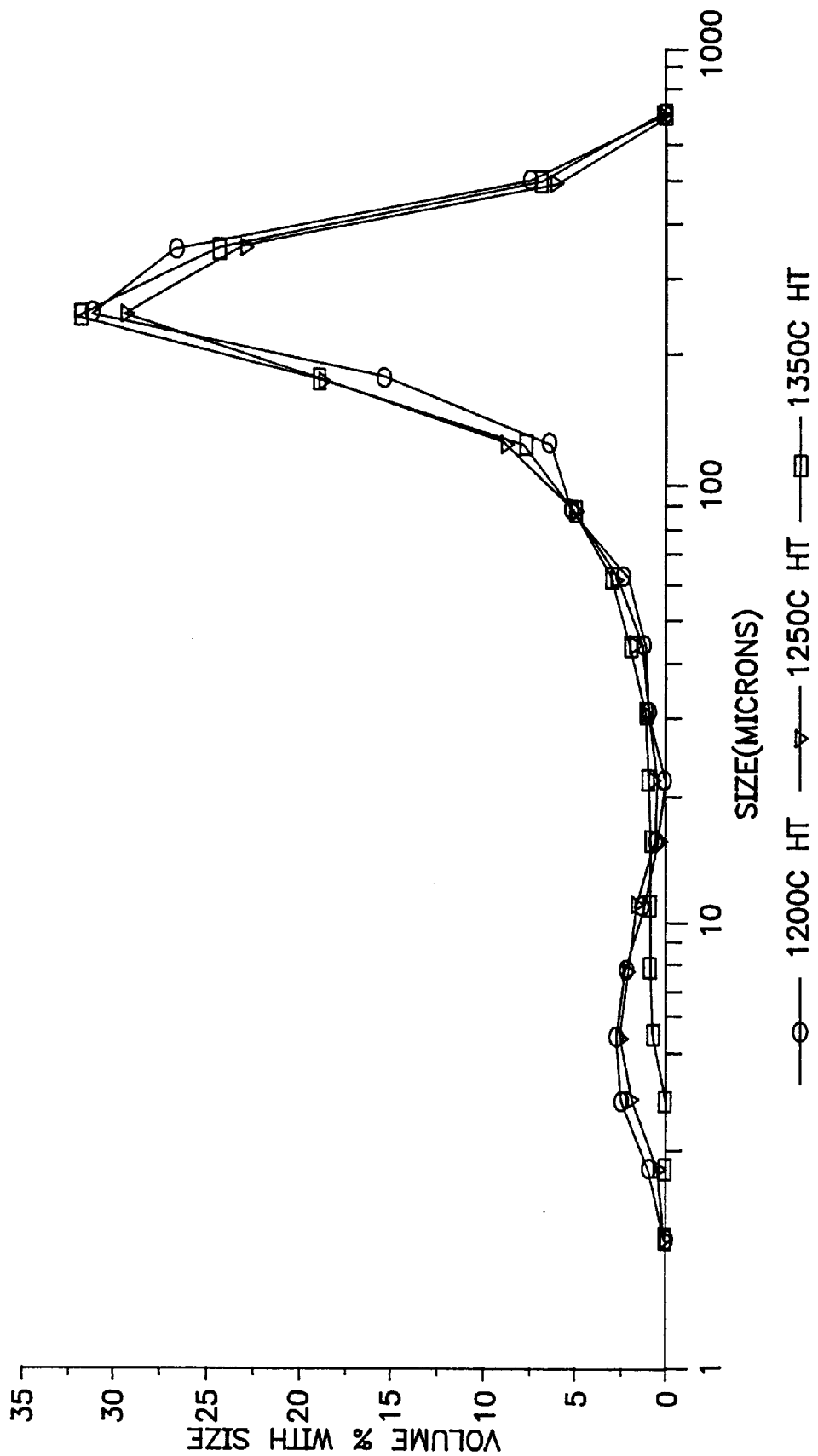
FIG. 5 shows the variation in the agglomerate size distribution of finished powders which were produced from basic lot powders sized according to a process of the present invention as a function of thermal agglomeration temperature.

The powders made using the process of the present invention show a dramatic improvement in flowability because of their agglomerate size distribution. In the finished stage, powders produced using conventional methods have a polydispersed distribution as seen in FIG. 4. The finished powders made using the process of the present invention have a substantially unimodal, narrow distribution after sizing, heat treatment, and deoxidation as can be seen in FIG. 4. FIG. 5 shows the effect of varying the heat treatment temperatures in producing the finished powders according to the present invention.

Figure 9:
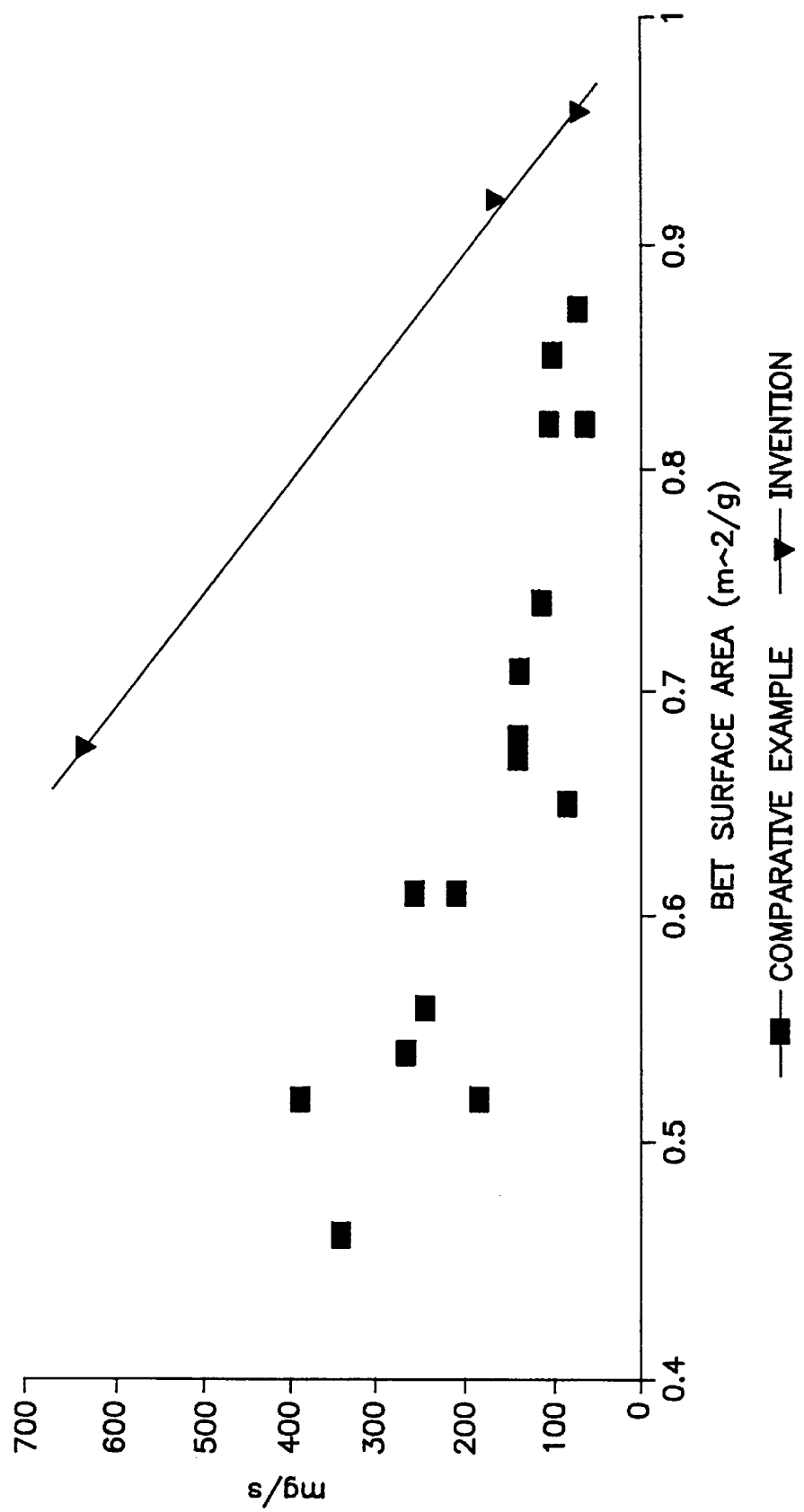
FIG. 9 shows die fill rates of basic lot powders which have been sized, thermally agglomerated and deoxidized according to the present invention.
Figure 11:
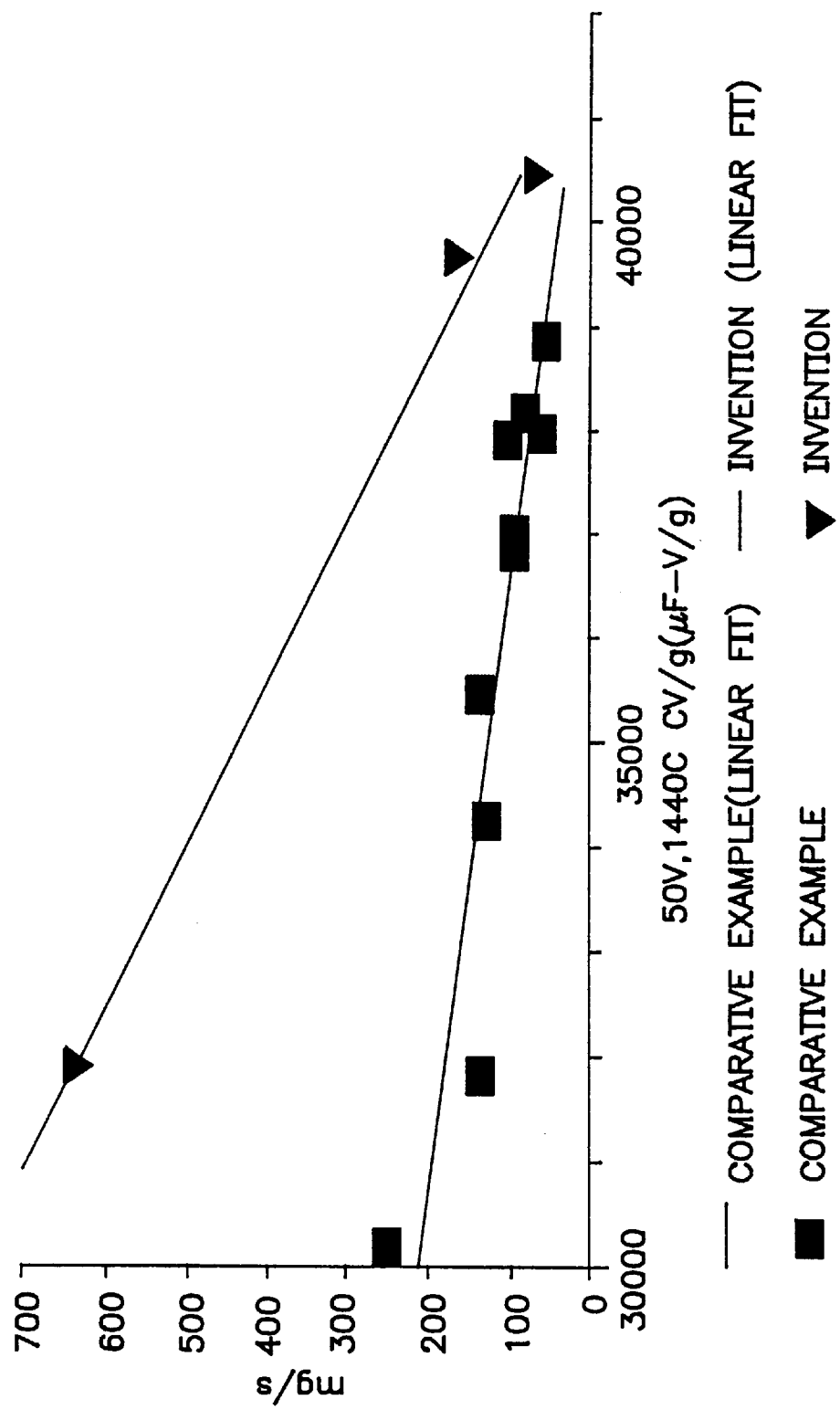
FIG. 11 shows die fill rates as a function of specific capacitance for basic lot powders which have been sized, thermally agglomerated, and deoxidized according to the present invention.

The flowability of finished (heat treated and deoxidized) powders was measured by a die fill test. This test very closely mimics the conditions under which capacitor manufacturers use tantalum powder. A hopper filled with 40 g of tantalum powder is passed over 10 holes with 0.125-inch diameter which are spaced 1 inch from each other in a row using an even 2 second pass. The weight of the powder that fills the 10 holes is measured after each pass. This process is continued until the hopper is empty. The average rate in mg/s is computed by regression analysis. For high capacitance powders a die fill rate of 130 to 150 mg/s is preferable with higher die fill rates being more preferred. Table 7 below compares the die fill flow rate of powders made with the present invention and conventional powder. Because the die fill rate depends on the specific charge of the powder (it is lower for powders with high specific charge), powders with similar specific charge are compared in Table 6 and graphed in FIG. 11. The die flow rates are also graphed at varying BET values in FIG. 9.

TABLE 6

| Powder | Specific Charge (CV/g) 1F-V/g | Die Fill Rate mg/s | Die Fill Rate after screening 20% * mg/s |
|---|---|---|---|
| Comparative Example | 37900 | 50 | 86 |
| A3-BDH1M | 39671 | 160 | — |
| A3-BDH1MS | 39671 | — | 634 |
| A3-BDH2M | 40455 | 63 | — |
| AB-BDH2MS | 40455 | — | 345 |
| Comparative Example | 34000 | 55 | 125 |
| A3-BDH3M | 31985 | 632 | Insufficient fines to screen |

* : −500 Mesh removed via screening

Figure 6:
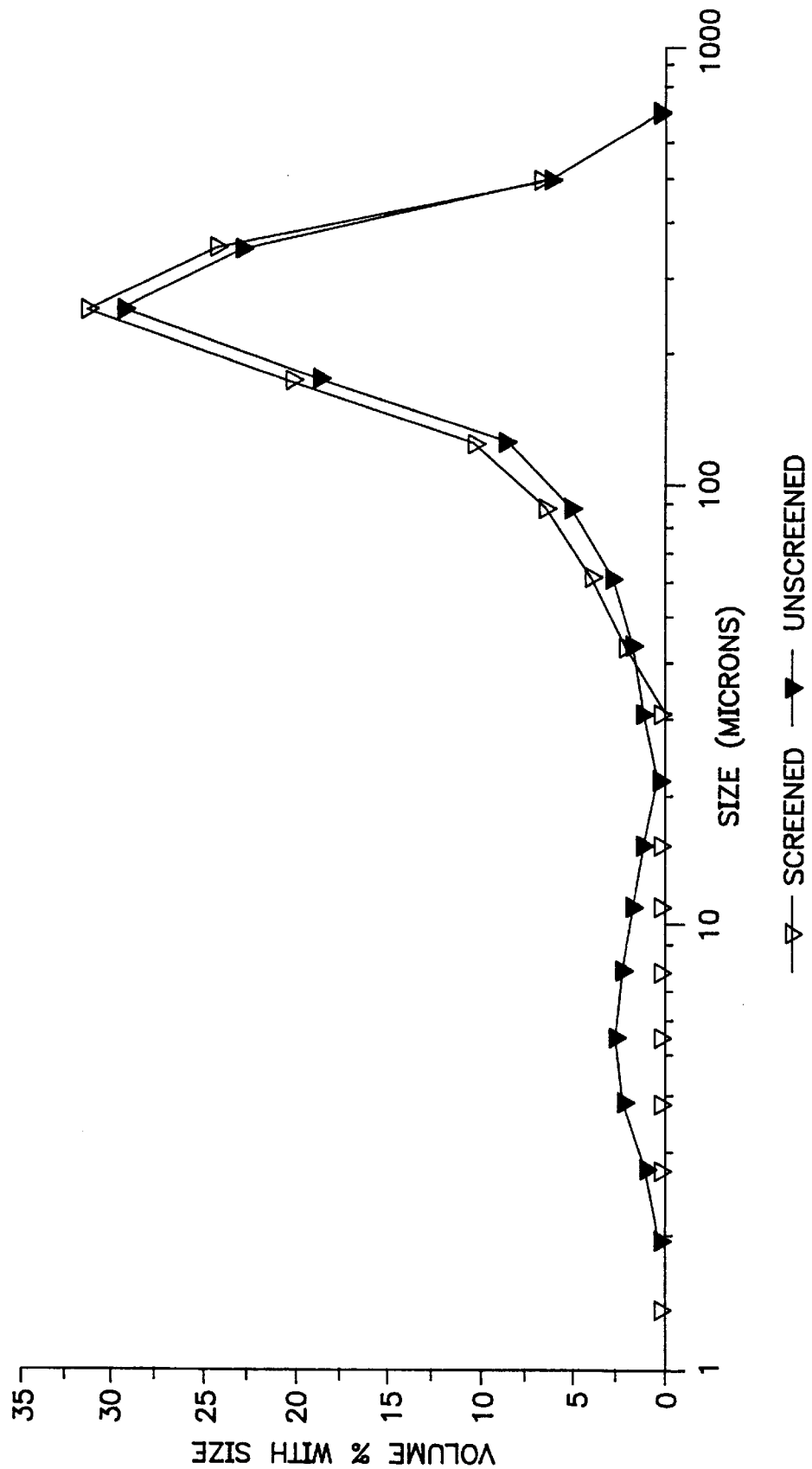
FIG. 6 shows the variation in the agglomerate size distribution of finished powders produced by thermally agglomerating and deoxidizing basic lot powders sized according to a process of the present invention at 1250° C. for 30 minutes shown in FIG. 5, before and after screening.

For conventional powders, one way to improve the flow has been screening out fines. Such improvements are only modest, however, as seen in Table 6 above. The effect of screening the powders produced by the process of the present invention was also evaluated. It is discovered that the flow performance of the comminuted powders of the present invention can be improved by a small amount of screening. Table 6 above shows the flow improvement obtained by screening on an as-comminuted particle size distribution. The fine "tail" of this distribution can be removed by screening, leaving behind a true unimodal and narrow particle size distribution, as shown in FIG. 6, with greatly enhanced flow.

An additional advantage is realized in the yield which results when screening finished powders according to the present invention. As can be seen from FIG. 4, which shows the size distributions of unscreened finished powders, because finished powders according to the present invention have a fine "tail" which constitutes a small volume percentage of the entire distribution, a larger yield of usable powder remains after screening. In contrast, the process of screening a conventional finished powder having a polydispersed size distribution removes a larger amount of powder when screened to the same mesh sizes. Furthermore, even after screening a conventional powder to the same mesh size, the size distribution of the remaining powder is still not as narrow as that which results from screened powders according to the present invention.

VI. Capacitors Comprising Powders Made According to the Present Invention

The specific charge of a powder is an important aspect of a powder which is to be used in the manufacture of capacitors. Although specific charge is commonly denoted by the designation "CV/cc" and is expressed in units of "$\mu$F-V/cc," those skilled in the art will recognize that the designation "CV/g," commonly used by powder manufacturers, may also be utilized and that designation is expressed in units of "$\mu$F-V/g."

In order to evaluate the performance of the powders of the present invention, rectangular capacitor anodes (3.21 mm×3.21 mm×1.36 mm and 70 mg) were produced by compressing tantalum powder produced in accordance with the present invention into pellets, with wire electrodes, to a density of between 5 to 7 g/cc green density and sintering the pellets at a temperature between 1300 to 1500° C. for 10 minutes under vacuum to produce a porous sintered body having uniform open pores. The porous body was then anodized by submersing the body in 0.1 volume ? phosphoric acid while applying a voltage of 50 to 100 volts. The anodes, after anodizing, rinsing, and drying, were first tested for electrical leakage. A 10 volume a phosphoric acid test solution was used. The anodes were immersed in the test solution to the top of the anode and a voltage of 70% of the final formation voltage (i.e., 35 volts if it was anodized at 50 volts) was applied for 2 minutes after which the electrical leakage was measured. After the electrical leakage measurements were completed, the specific charge was measured on the anode employing a type 1611B General Radio Capacitance Test Bridge. The capacitors produced from powders according to the present invention using a 50V formation voltage typically ranged from 20,000 $\mu$F-V to 50,000 $\lambda$F-V.

Figure 8:
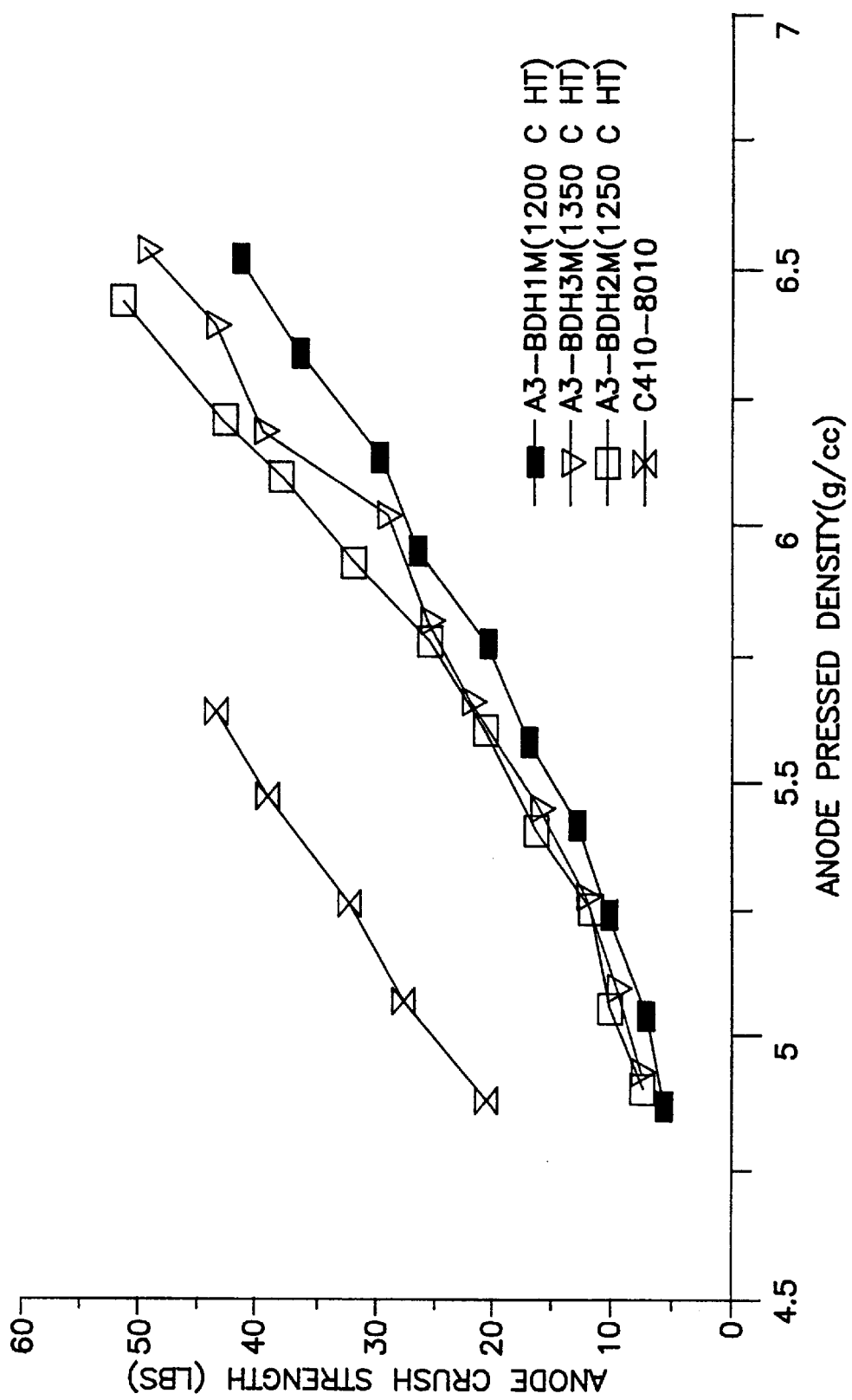
FIG. 8 shows the strength profiles of anodes produced using basic lot powders which have been sized, thermally agglomerated, and deoxidized according to the present invention.
Figure 12:
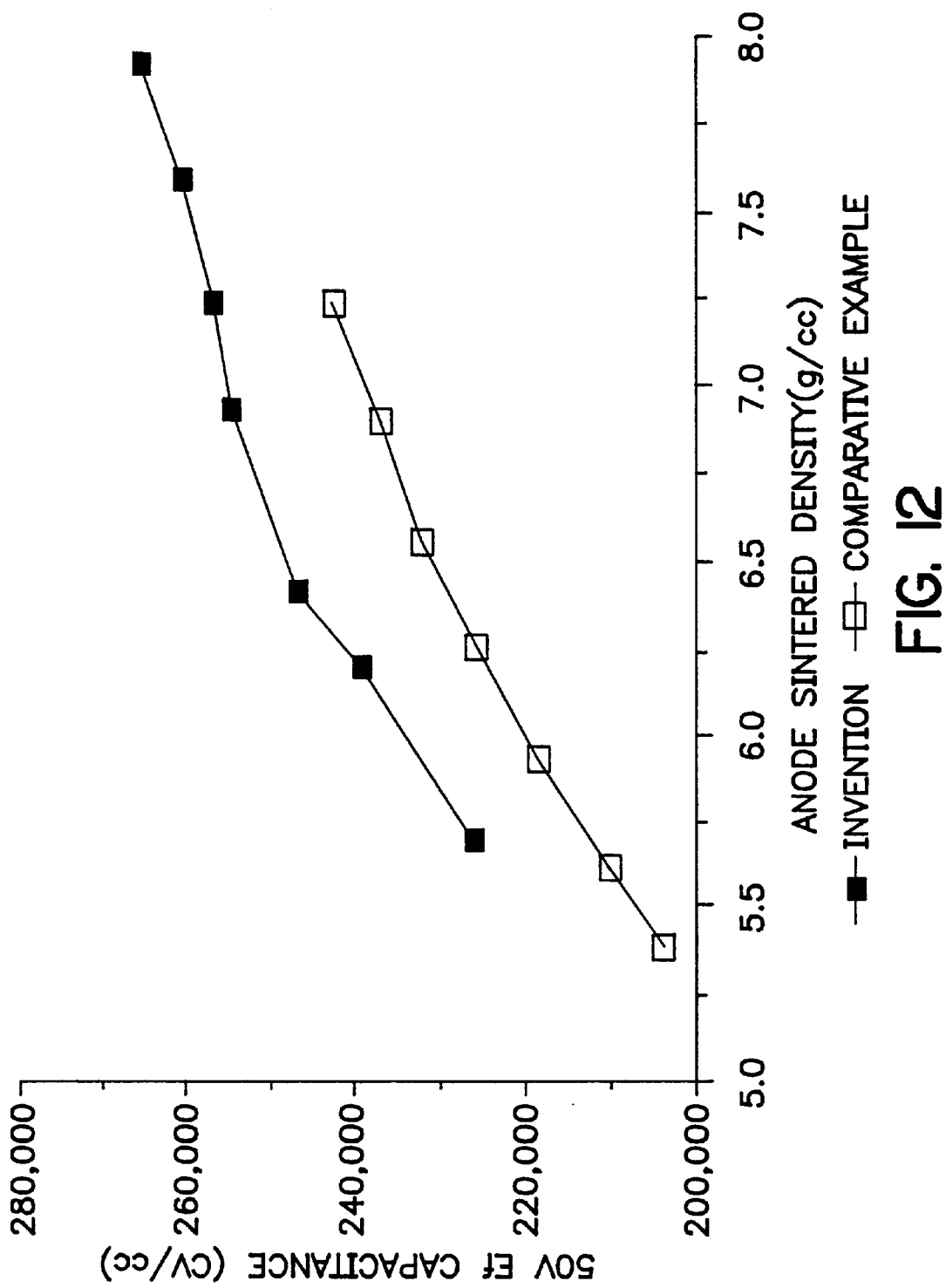
FIG. 12 shows the volumetric efficiency as a function of anode sintered density for basic lot powders which have been sized, thermally agglomerated, and deoxidized according to the present invention and for powders produced using conventional methods.

Comparative capacitor anode samples were produced by the same process using the comparative samples of Tables 4 and 5. The physical and electrical properties of the capacitors produced using conventional powders and the powders of the present invention were evaluated. FIGS. 8 and 12 graphically represent this data and serve to further explain the present invention with regard to the effect of sizing the tantalum powders. FIG. 8 shows the green strength of the anodes to be 25 lbs and above when pressed at or above a press density of 6.0 g/cc. This green strength is adequate for capacitor manufacturing.

FIG. 12 compares the volumetric efficiency of an anode made from a powder according to the present invention with a conventional powder having a similar specific charge (CV/g). The powders of the present invention have higher volumetric efficiencies than conventional powders. It is believed that this is the result of the unique combination of high bulk density and high specific charge of the powders of the present invention. The porosity distribution of the powders of the present invention when pressed to a press density of 6.5 g/cc is the same as that obtained when pressing a conventional powder from which approximately 45 volume % of the powder has been screened using a 325 mesh screen at the same press density. Thus, higher volumetric efficiencies are achieved over the conventional powders. It is believed that conventional powders, if not screened, cannot be pressed to such press densities. Typically, conventional powders are only pressed to press densities of 5 to 5.5 g/cc.

VII. Better Volumetric Efficiency

Figure 10:
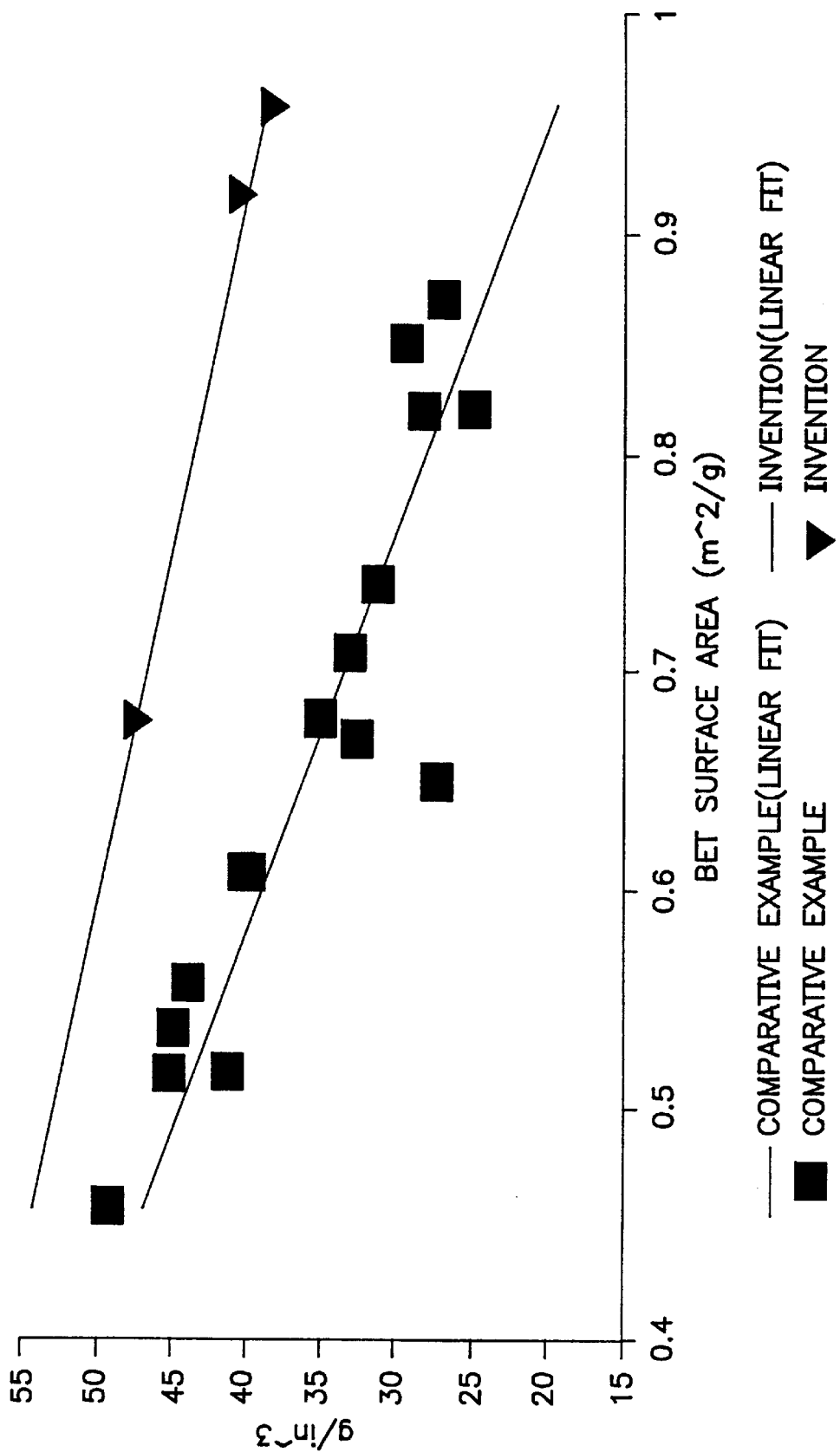
FIG. 10 shows the Scott Bulk Densities as a function of BET Surface Areas for basic lot powders which have been sized, thermally agglomerated, and deoxidized according to the present invention.

For high capacitance powders, a critical parameter is the charge per unit volume. Capacitor manufacturers can meet the charge requirements using a smaller case size if powder manufacturers can provide high CV/cc powders. Powders made according to the present invention have higher bulk density (1.25 to 3.44 g/cc or 20 to 55 g/in$^3$) than conventional powders having similar surface areas made using conventional processes (1.25 to 1.6 g/cc or 20 to 25.6 g/in$^3$). See FIGS. 10 and 11. Consequently, for similar specific surface areas, powders made according to the present invention can be pressed to higher densities using the same pressing ratio. If conventional powders with low bulk densities and irregular size distributions are pressed to high green densities, pore closure results and, consequently, surface area and capacitance are reduced. The invention powders can be used at high press densities such as 6.5 and 7.0 g/cc while conventional powders can reasonably be used at 5.0 to 5.5 g/cc.

This improvement in electrical performance is best illustrated in FIG. 12 which clearly shows that, for comparable specific charge, the powders made according to the present invention have higher CV/cc values than conventional powders.

VIII. Leakage Data

Shown in Table 7 below are electrical leakage data of capacitors made from powders according to the the present invention. Table 8 shows comparative leakage data of capacitors produced from conventional powders sintered at 1400° C. for 30 minutes for samples A6-BHM; 1425° C. for 30 minutes for samples B8-BHM; and 1450° C. for 30 minutes for samples A8-BHM. Upon comparing capacitors having similar capacitance values, those produced from invention powders have similar leakage values even when lower sintering temperatures are used. For example, a capacitor having a capacitance of 230,587 CV/cc produced by pressing powder Sample ID# A3-BDH2M of the present invention to a press density of 5.0 g/cc, sintering at 1250° C. for 60 minutes, and then forming a dielectric using a formation voltage of 50 volts has a DC leakage of 8.81 ($\mu$ A/g). This is comparable to the DC leakage of 8.34 ($\mu$ A/g) obtained by a capacitor having a capacitance of 219,218 CV/cc produced by pressing comparative powder Sample ID# A6-BHM to a press density of 5.0 g/cc, sintering at 1400° C. for 30 minutes, and then forming a dielectric using a formation voltage of 50 volts.

TABLE 7

Electrical Properties of Invention Powders

| Sample ID | Press Density g/cc | Sinter Temperature C | Formation Voltage | Capacitance (CV/g) $\mu$F-V/g | Capacitance (CV/cc) $\mu$F-V/cc | DC Leakage (uA/g) (uA/g) | DC Leakage (nA/CV) (nA/$\mu$F-V) |
|---|---|---|---|---|---|---|---|
| A3-BDH3M | 5.0 | 1325 | 50 V | 37,781 | 193,336 | 8.51 | 0.23 |
| A3-BDH3M | 5.3 | 1335 | 50 V | 37,315 | 204,339 | 6.92 | 0.19 |
| A3-BDH3M | 5.6 | 1335 | 50 V | 36,630 | 206,231 | 6.45 | 0.18 |
| A3-BDH3M | 5.9 | 1335 | 50 V | 35,972 | 218,161 | 6.79 | 0.19 |
| A3-BDH3M | 6.2 | 1335 | 50 V | 35,496 | 228,546 | 6.77 | 0.19 |
| A3-BDH3M | 6.5 | 1335 | 50 V | 34,649 | 235,006 | 6.47 | 0.19 |
| A3-BDH3M | 6.8 | 1335 | 50 V | 33,907 | 240,481 | 5.86 | 0.17 |
| A3-BDH3M | 5.0 | 1405 | 50 V | 31,985 | 178,636 | 3.05 | 0.10 |
| A3-BDH3M | 5.3 | 1405 | 50 V | 32,188 | 197,826 | 3.92 | 0.12 |
| A3-BDH3M | 5.6 | 1405 | 50 V | 30,838 | 193,516 | 3.21 | 0.10 |
| A3-BDH3M | 5.9 | 1405 | 50 V | 30,631 | 208,434 | 3.21 | 0.10 |

TABLE 7-continued

Electrical Properties of Invention Powders

| Sample ID | Press Density g/cc | Sinter Temperature C | Formation Voltage | Capacitance (CV/g) μF-V/g | Capacitance (CV/cc) μF-V/cc | DC Leakage (uA/g) (uA/g) | DC Leakage (nA/CV) (nA/μF-V) |
|---|---|---|---|---|---|---|---|
| A3-BDH3M | 6.2 | 1405 | 50 V | 30,323 | 215,536 | 3.12 | 0.10 |
| A3-BDH3M | 6.5 | 1405 | 50 V | 29,461 | 223,563 | 3.01 | 0.10 |
| A3-BDH3M | 6.8 | 1405 | 50 V | 28,653 | 224,043 | 2.93 | 0.10 |
| A3-BDH2M | 5.0 | 1335 | 50 V | 44,379 | 230,587 | 8.81 | 0.20 |
| A3-BDH2M | 5.3 | 133s | 50 V | 43,745 | 240,597 | 9.73 | 0.22 |
| A3-BDH2M | 5.8 | 1335 | 50 V | 42,909 | 251,414 | 10.00 | 0.23 |
| A3-BDH2M | 5.9 | 1335 | 50 V | 41,823 | 259,480 | 11.18 | 0.27 |
| A3-BDH2M | 6.2 | 1335 | 50 V | 40,903 | 267,635 | 9.27 | 0.23 |
| A3-BDH2M | 6.5 | 1335 | 50 V | 39,957 | 273,538 | 9.37 | 0.23 |
| A3-BDH2M | 6.8 | 1335 | 50 V | 38,834 | 277,314 | 7.78 | 0.20 |
| A3-BDH2M | 5.0 | 1405 | 50 V | 39,671 | 225,480 | 5.43 | 0.14 |
| A3-BDH2M | 5.3 | 1405 | 50 V | 38.457 | 238.294 | 5.26 | 0.14 |
| A3-BDH2M | 5.6 | 1405 | 50 V | 38,341 | 245,951 | 4.46 | 0.12 |
| A3-BDH2M | 5.9 | 1405 | 50 V | 36,599 | 253,667 | 5.99 | 0.16 |
| A3-BDH2M | 6.2 | 1405 | 50 V | 35,384 | 255,670 | 4.58 | 0.13 |
| A3-BDH2M | 6.5 | 1405 | 50 V | 34,213 | 259,599 | 4.70 | 0.14 |
| A3-BDH2M | 6.8 | 1405 | 50 V | 33,440 | 264,503 | 4.43 | 0.13 |
| A3-BDH1M | 5.0 | 1335 | 50 V | 48,522 | 254,164 | 9.11 | 0.19 |
| A3-BDH1M | 5.3 | 1335 | 50 V | 44,993 | 249,621 | 15.29 | 0.34 |
| A3-BDH1M | 5.6 | 1335 | 50 V | 44,031 | 259,173 | 7.63 | 0.17 |
| A3-BDH1M | 5.9 | 1335 | 50 V | 42,840 | 269,655 | 8.55 | 0.20 |
| A3-BDH1M | 6.2 | 1335 | 50 V | 42,138 | 275.377 | 9.53 | 0.23 |
| A3-BDH1M | 6.5 | 1335 | 50 V | 40,528 | 283,633 | 7.35 | 0.18 |
| A3-BDH1M | 6.8 | 1335 | 50 V | 39,560 | 288,373 | 11.85 | 0.30 |
| A3-BDH1M | 5.0 | 1405 | 50 V | 40,455 | 236,047 | 4.58 | 0.11 |
| A3-BDH1M | 5.3 | 1405 | 50 V | 39,628 | 243,384 | 5.09 | 0.13 |
| A3-BDH1M | 5.6 | 1405 | 50 V | 38,564 | 254,105 | 4.21 | 0.11 |
| A3-BDH1M | 5.9 | 1405 | 50 V | 37,257 | 260,455 | 5.15 | 0.14 |
| A3-BDH1M | 6.2 | 1405 | 50 V | 36,691 | 260,742 | 4.48 | 0.12 |
| A3-BDH1M | 6.5 | 1405 | 50 V | 34,601 | 268.759 | 3.98 | 0.12 |
| A3-BDH1M | 6.8 | 1405 | 50 V | 33,623 | 270,767 | 4.24 | 0.13 |
| A1-BDH1M | 6.0 | 1360 | 50 V | 43,601 | 277,392 | 9.03 | 0.21 |
| A1-BDH1M | 6.0 | 1440 | 50 V | 35,949 | 263,272 | 5.43 | 0.15 |
| A1-BDH1M | 6.0 | 1360 | 70 V | 37,497 | 239,325 | 13.35 | 0.36 |
| A1-BDH1M | 6.0 | 1440 | 70 V | 30,868 | 223,802 | 8.29 | 0.27 |
| B1-BDH3M | 6.0 | 1360 | 50 V | 28,220 | 175,130 | 4.62 | 0.16 |
| B1-BDH3M | 6.0 | 1360 | 70 V | 25,668 | 158,614 | 8.48 | 0.33 |
| B1-BDH3M | 6.0 | 1440 | 50 V | 25,593 | 167,204 | 3.62 | 0.14 |
| B1-BDH3M | 6.0 | 1440 | 70 V | 23,700 | 152,069 | 4.97 | 0.21 |
| B1-BDH4M | 6.0 | 1440 | 50 V | 20,786 | 129,444 | 3.01 | 0.15 |
| B1-BDH4M | 6.0 | 1440 | 70 V | 19,495 | 121,123 | 3.18 | 0.17 |
| B1-BDH4M | 6.0 | 1360 | 70 V | 20,332 | 122,442 | 5.26 | 0.26 |
| B1-BDH4M | 6.0 | 1360 | 50 V | 21,880 | 131,275 | 4.14 | 0.19 |

TABLE 8

Electrical Properties of Prior Art and Comparative Example Powders

| Sample ID | Press Density g/cc | Sinter Temperature C | Formation Voltage | Capacitance (CV/g) μF-V/g | Capacitance (CV/cc) μF-V/cc | DC Leakage (uA/g) | DC Leakage (nA/CV) (nA/μF-V) |
|---|---|---|---|---|---|---|---|
| A6-BHM | 5.0 | 1335 | 50 V | 40,268 | 203,417 | 5.97 | 0.15 |
| A6-BHM | 5.3 | 1335 | 50 V | 39,725 | 211,395 | 5.46 | 0.14 |
| A6-BHM | 5.6 | 1335 | 50 V | 39,110 | 220,081 | 6.23 | 0.16 |
| A6-BHM | 5.9 | 1335 | 50 V | 38,366 | 227,477 | 6.36 | 0.17 |
| A6-BHM | 6.2 | 1335 | 50 V | 37,704 | 234,021 | 6.72 | 0.18 |
| A6-BHM | 6.5 | 1335 | 50 V | 36,885 | 241,628 | 5.55 | 0.15 |
| A6-BHM | 6.8 | 1335 | 50 V | 35,903 | 247,273 | 5.15 | 0.14 |
| A6-BHM | 5.0 | 1405 | 50 V | 37,900 | 203,744 | 3.92 | 0.10 |
| A6-BHM | 5.3 | 1405 | 50 V | 37,419 | 209,682 | 3.6 | 0.10 |
| A6-BHM | 5.6 | 1405 | 50 V | 36,780 | 217,772 | 3.7 | 0.10 |
| A6-BHM | 5.9 | 1405 | 50 V | 35,976 | 225,013 | 4.0 | 0.11 |
| A6-BHM | 6.2 | 1405 | 50 V | 35,266 | 231,142 | 4.0 | 0.11 |
| A6-BHM | 6.5 | 1405 | 50 V | 34,207 | 235,846 | 4.1 | 0.12 |
| A6-BHM | 6.8 | 1405 | 50 V | 33,375 | 241,100 | 4.9 | 0.15 |
| A6-BHM | 5.0 | 1360 | 50 V | 43,797 | 219,218 | 8.34 | 0.19 |
| A6-BHM | 5.0 | 1440 | 50 V | 39,964 | 221,680 | 4.96 | 0.12 |
| A6-BHM | 5.0 | 1360 | 70 V | 39,305 | 198,020 | 12.75 | 0.32 |
| A6-BHM | 5.0 | 1440 | 70 V | 36,389 | 200,869 | 7.64 | 0.21 |

TABLE 8-continued

Electrical Properties of Prior Art and Comparative Example Powders

| Sample ID | Press Density g/cc | Sinter Temperature C | Formation Voltage | Capacitance (CV/g) μF-V/g | Capacitance (CV/cc) μF-V/cc | DC Leakage (uA/g) | DC Leakage (nA/CV) (nA/μF-V) |
|---|---|---|---|---|---|---|---|
| B8-BHM | 5.0 | 1440 | 50 V | 34,053 | 184,366 | 5.93 | 0.18 |
| B8-BHM | 5.0 | 1440 | 70 V | 31,438 | 169,355 | 12.81 | 0.41 |
| B8-BHM | 5.0 | 1360 | 50 V | 36,563 | 184,671 | 10.74 | 0.29 |
| B8-BHM | 5.0 | 1360 | 70 V | 33,585 | 169,258 | 24.58 | 0.74 |
| A8-BHM | 5.0 | 1360 | 70 V | 32,281 | 161,223 | 9.12 | 0.28 |
| A8-BHM | 5.0 | 1360 | 50 V | 35,009 | 175,274 | 6.27 | 0.18 |
| A8-BHM | 5.0 | 1440 | 70 V | 30,720 | 160,195 | 7.80 | 0.26 |
| A8-BHM | 5.0 | 1440 | 50 V | 33,170 | 173,240 | 4.62 | 0.14 |

Figure 15:
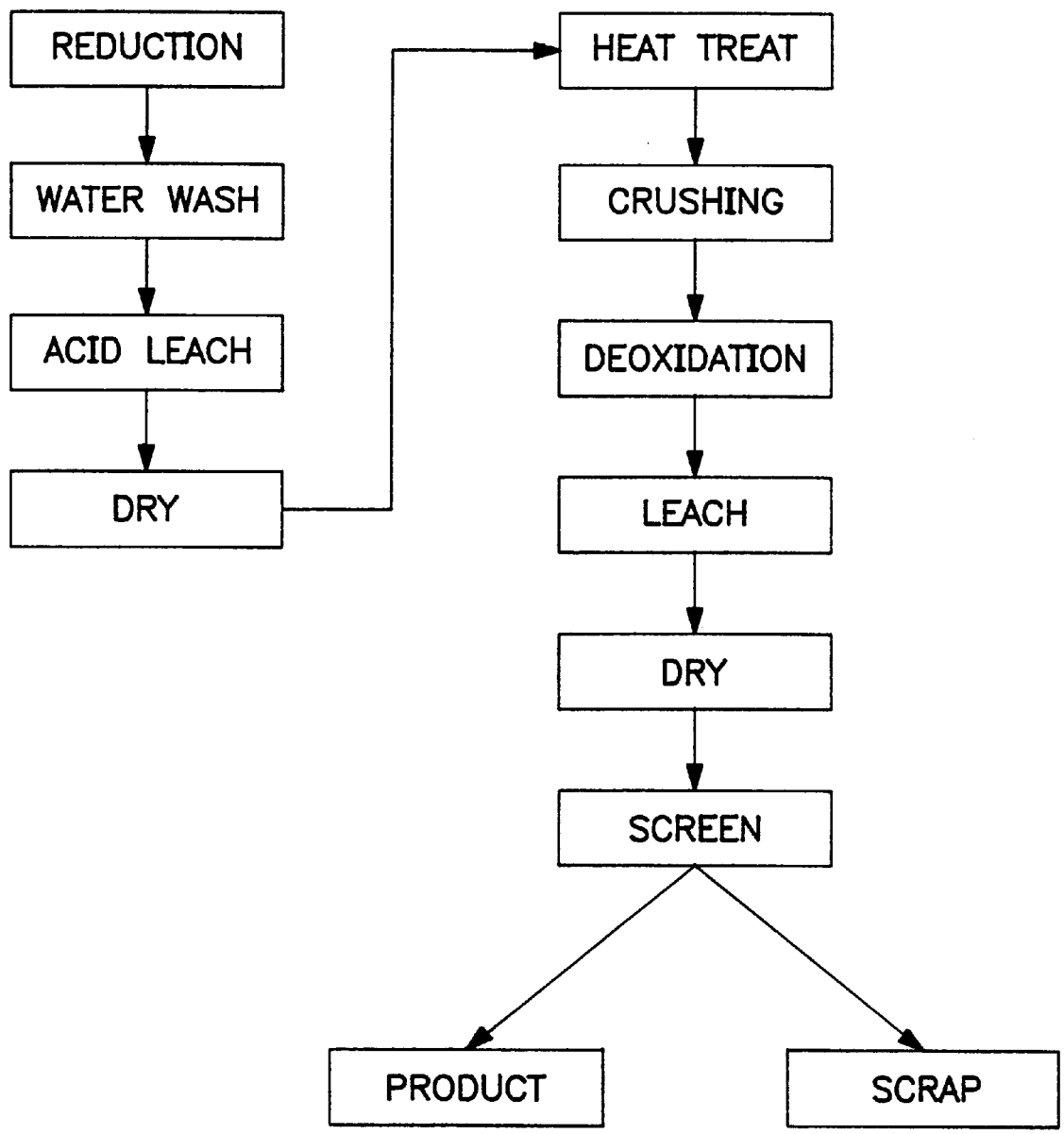
FIG. 15 is a schematic block diagram illustrating a conventional process for producing high-surface area tantalum powder, suitable for making capacitor electrodes and other such articles, from a chemically reduced tantalum basic lot powder product comprising agglomerates of smaller tantalum particles.
Figure 16:
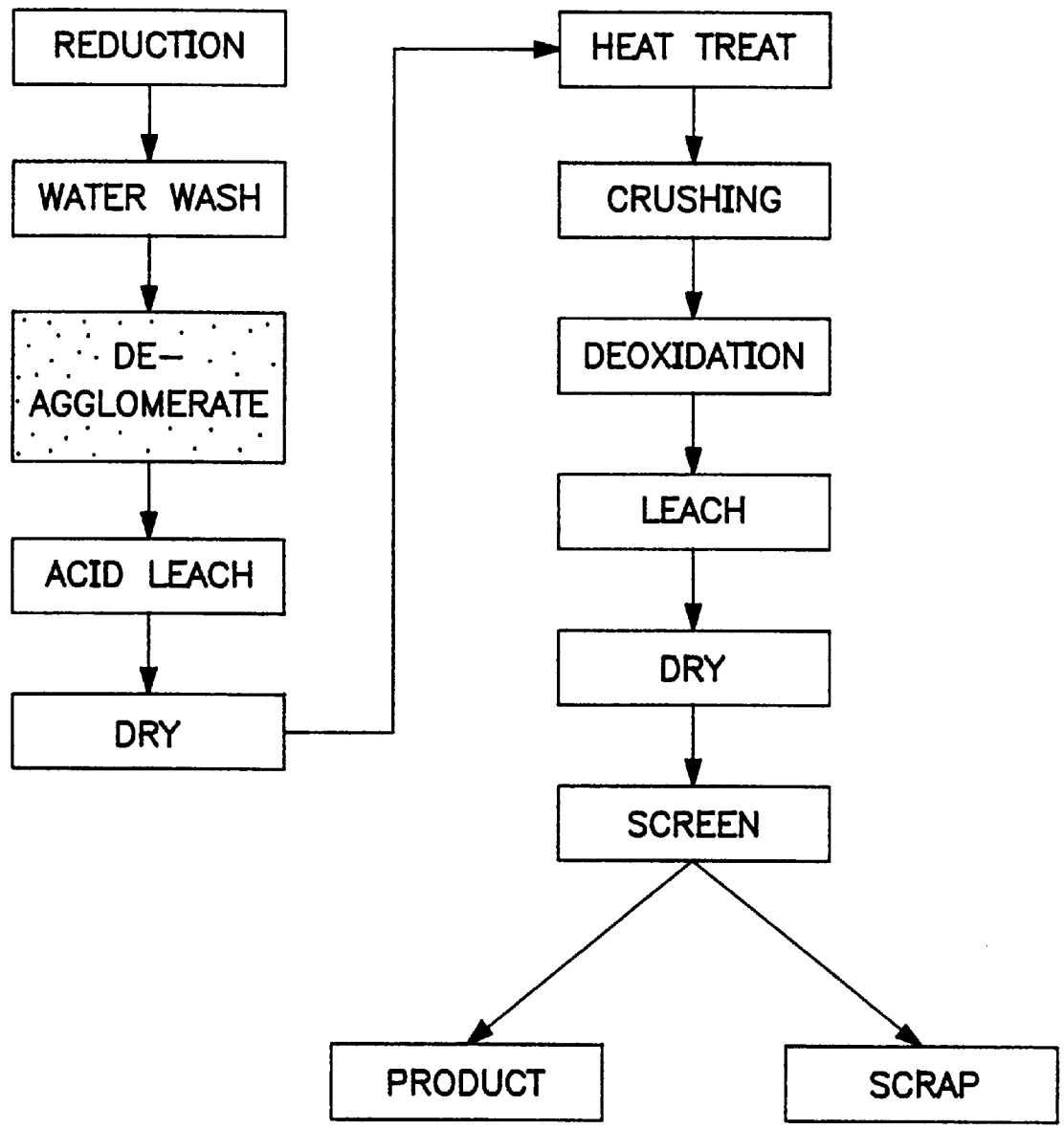
FIG. 16 is a schematic block diagram illustrating one embodiment of the process of the present invention.

In general, as exemplified by the foregoing examples and as illustrated in FIG. 16, the present invention comprises a process for making, from chemically reduced basic lot powders of tantalum, a finely divided form of that powder with characteristics, including particle size and particle size distribution, by which the resultant powder is particularly well adapted to making sintered porous bodies, such as capacitor electrodes, with improved characteristics. This process is also thought to be useful for achieving similar improvements in the final particle size and particle size distribution of any metal powder, the pre-treated form of which comprises agglomerates of smaller particles. This includes, for example, the finished powder identified as "product" as well as the agglomerated by-product identified as "scrap" in the conventional process illustrated in FIG. 15.

As compared to the process illustrated in FIG. 16, other alternative embodiments encompass similar processes wherein the comminution precedes essentially any heat treatment step, either directly or indirectly.

The present invention is particularly useful for sizing an improved tantalum powder as specifically described above. However, although illustrated and described herein with reference to certain specific embodiments, the present invention is nevertheless not intended to be limited to the details shown. Rather, various modifications may be made in the details within the scope and range of equivalents of the appended claims and without departing from the spirit of the invention.

What is claimed:

1. A capacitor having a central electrode body comprising a sintered metal anode with an electrode lead, said anode comprising a sintered product produced from a tantalum powder having deagglomerated particles said deagglomerated particles having a size distribution characterized in that a result obtained by multiplying Volume Mean Diameter, MV in microns, times specific surface area, in $m^2/g$ as measured by a nitrogen Brunauer, Emmet, Teller process, is in the range below about 25 microns·$m^2/g$.

2. A capacitor having a central electrode body comprising a sintered metal anode with an electrode lead, said anode comprising a sintered product produced from a tantalum powder prepared from a basic lot powder of tantalum prepared by a reduction step followed by water wash, acid leach, and drying steps prior to heat treating, said basic lot powder of tantalum having basic lot agglomerates comprised of individual powder particles, subjecting said basic lot powder to a deagglomeration step between said reduction and heat treat steps, said deagglomeration step being continued until a deagglomerated product has a size distribution such that a result obtained by multiplying Volume Mean Diameter, MV in microns, times specific surface area, in $m^2/g$ as measured by a nitrogen Brunauer, Emmett, Teller process, is below about 25 microns·$m^2/g$.

3. A capacitor having a central electrode body comprising a sintered metal anode with an electrode lead, said anode comprising a sintered product produced from a heat treated and deoxidized tantalum powder having heat treated and deoxidized agglomerate particles wherein Volume Mean Diameter, MV in microns, times specific surface area, in $m^2/g$ as measured by a nitrogen Brunauer, Emmett, Teller process (BET) of the heat treated and deoxidized agglomerate particles results in a range from about 90 to about 250 microns-$m^2/g$ when specific surface area (BET) method is greater than about 0.7 $m^2/g$.

4. A capacitor according to claim 2 wherein said basic lot powder of tantalum has deagglomerated particles having a ratio of Scott Bulk Density in $g/in^3$ to Surface Area in $m^2/g$ as measured by the nitrogen Brunauer, Emmett, Teller process between about 20 to about 35.

5. A capacitor according to claim 3 wherein said heat treated and deoxidized tantalum powder particles have a ratio of Scott Bulk Density in $g/in^3$ to Surface Area in $m^2/g$ as measured by the nitrogen Brunauer, Emmett, Teller process from about 38 to about 50 when the particles have a surface area greater than 0.86 (BET method).

6. A capacitor having a central electrode body comprising a sintered metal anode with an electrode lead, said anode comprising a sintered product produced from a heat treated and deoxidized tantalum powder having particles having a ratio of Die Fill Rate in mg/s to the Surface Area in $m^2/g$ as determined by a nitrogen Brunauer, Emmett, Teller method between about 66 and 160 for powders with surface area greater than 0.86 $m^2/g$ as determined by the Brunauer, Emmett, Teller method.

7. A capacitor according to claim 6 wherein said ratio of Die Fill Rate to Surface Area as measured by the nitrogen Brunauer, Emmett, Teller process, after said powder is screened to +500 mesh, between about 350 to about 700.

* * * * *

UNITED STATES PATENT AND TRADE MARK OFFICE
CERTIFICATE OF CORRECTION

PATENT NO. : 5,986,877
DATED : November 16, 1999
INVENTOR(S) : Pathare et al.

It is certified that error appears in the above-identified patent and that said Letters Patent is hereby corrected as shown below:

Title page, Item [54], delete the word "POWER" and substitute therefor -- POWDER --.

Column 12, line 21, in Table 4, delete "BHM" and substitute therefor -- DHM --.

Column 12, line 22, in Table 4, delete "BHM" and substitute therefor -- DHM --.

Column 14, line 24, in Table 6, delete "AB" and substitute therefor -- A3 --.

Column 15, line 10, delete "?" and substitute therefor -- % --.

Column 15, line 13, delete "a" and substitute therefor -- % --.

Column 15, line 23, delete "$\lambda$" and substitute therefore -- $\mu$ --.

Columns 15 and 16, Table 7, column 3, line 1, delete "1325" and substitute therefor -- 1335 --.

UNITED STATES PATENT AND TRADEMARK OFFICE
CERTIFICATE OF CORRECTION

PATENT NO. : 5,986,877
DATED : November 16, 1999
INVENTOR(S) : Pathare et al.

It is certified that error appears in the above-identified patent and that said Letters Patent is hereby corrected as shown below:

Columns 17 and 18, Table 7, column 3, line 5, delete "133s" and substitute therefor -- 1335 --.

Columns 17 and 18, Table 7, column 2, line 6, delete "5.8" and substitute therefor -- 5.6 --.

Column 20, line 51, delete "the".

Signed and Sealed this

Nineteenth Day of September, 2000

Attest:

Attesting Officer

Q. TODD DICKINSON
Director of Patents and Trademarks